(12) United States Patent
McMillen

(10) Patent No.: US 7,559,594 B2
(45) Date of Patent: Jul. 14, 2009

(54) FOLD FLAT SEATING

(75) Inventor: Robert J. McMillen, Tecumseh (CA)

(73) Assignee: Schukra of North America, Ltd., Lakeshore-Tecumseh (CA)

(*) Notice: Subject to any disclaimer, the term of this patent is extended or adjusted under 35 U.S.C. 154(b) by 303 days.

(21) Appl. No.: 11/681,861

(22) Filed: Mar. 5, 2007

(65) Prior Publication Data

US 2007/0216185 A1  Sep. 20, 2007

Related U.S. Application Data

(60) Provisional application No. 60/778,955, filed on Mar. 3, 2006.

(51) Int. Cl.
*B60N 2/005* (2006.01)

(52) U.S. Cl. ............... 296/65.09; 297/14; 297/326

(58) Field of Classification Search .......... 296/65.09, 296/65.01, 65.05; 297/14, 325, 326
See application file for complete search history.

(56) References Cited

U.S. PATENT DOCUMENTS

| | | |
|---|---|---|
| 4,779,917 A | 10/1988 | Campbell et al. |
| 5,011,209 A | 4/1991 | Takarabe et al. |
| 5,039,155 A | 8/1991 | Suman et al. |
| 5,044,683 A | 9/1991 | Parsson |
| 5,056,849 A | 10/1991 | Norris, Jr. et al. |
| 5,280,987 A | 1/1994 | Miller |
| 5,492,386 A | 2/1996 | Callum |
| 5,671,948 A * | 9/1997 | Susko et al. ............. 280/801.1 |
| 6,082,805 A | 7/2000 | Gray et al. |
| 6,142,552 A | 11/2000 | Husted et al. |
| 6,179,362 B1 | 1/2001 | Wisniewski et al. |
| 6,318,784 B2 | 11/2001 | Nishide |
| 6,474,741 B2 | 11/2002 | Kamida et al. |
| 6,601,901 B1 | 8/2003 | Schambre et al. |
| 6,651,274 B2 | 11/2003 | Swihart et al. |
| 6,837,530 B2 | 1/2005 | Rudberg et al. |
| 6,886,878 B2 | 5/2005 | Schambre et al. |

* cited by examiner

*Primary Examiner*—Joseph D Pape
(74) *Attorney, Agent, or Firm*—Kang Intellectual Property Law, LLC; Grant D. Kang

(57) ABSTRACT

A folding seat for a vehicle includes a seat base fixed to an intermediate bracket, a seat back having a lower end and a support bracket fixed to the vehicle. An intermediate bracket has a first hinge point where the seat back lower end is hingedly attached to the intermediate bracket. The intermediate bracket has a second hinge point where the intermediate bracket is hingedly attached to the support bracket, and which is spatially removed from the first hinge point. Upon folding of the seat base into a vertical position, the intermediate bracket rotates on the second hinge point, which remains stationary and the first hinge point rotates upwardly and rearwardly around the second hinge point, so that the first hinge point and the lower seat back move rearwardly as the seat back and the seat base are folded into vertical orientation close to the rear vehicle wall.

21 Claims, 27 Drawing Sheets

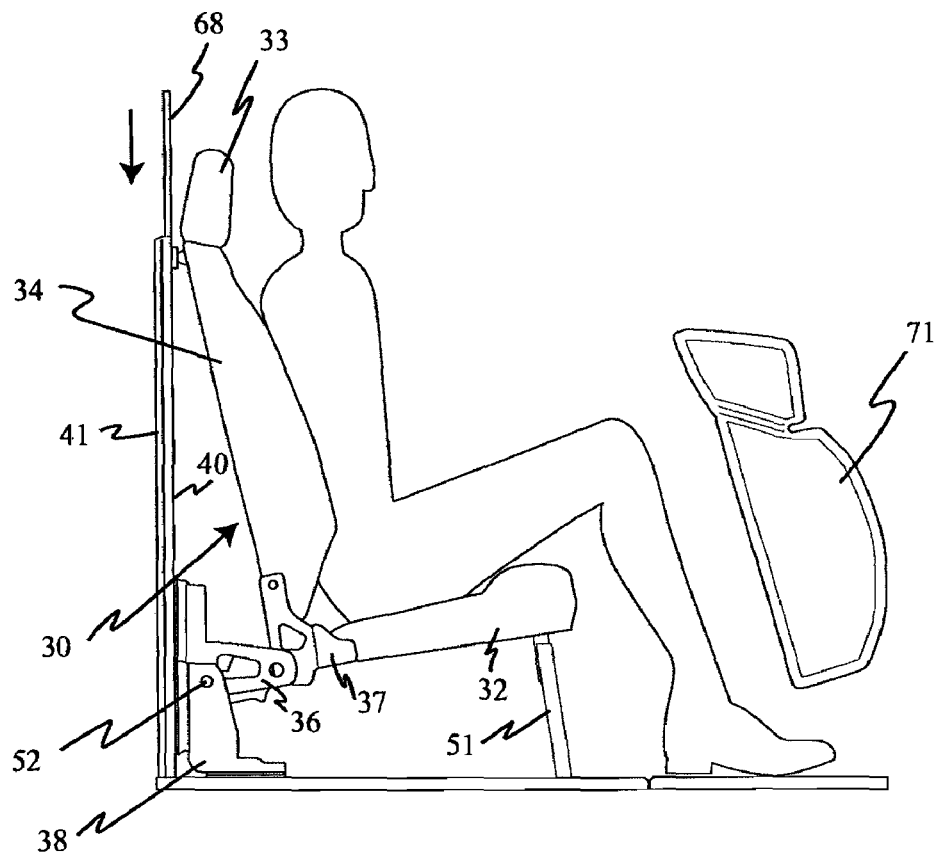
Figure 7A
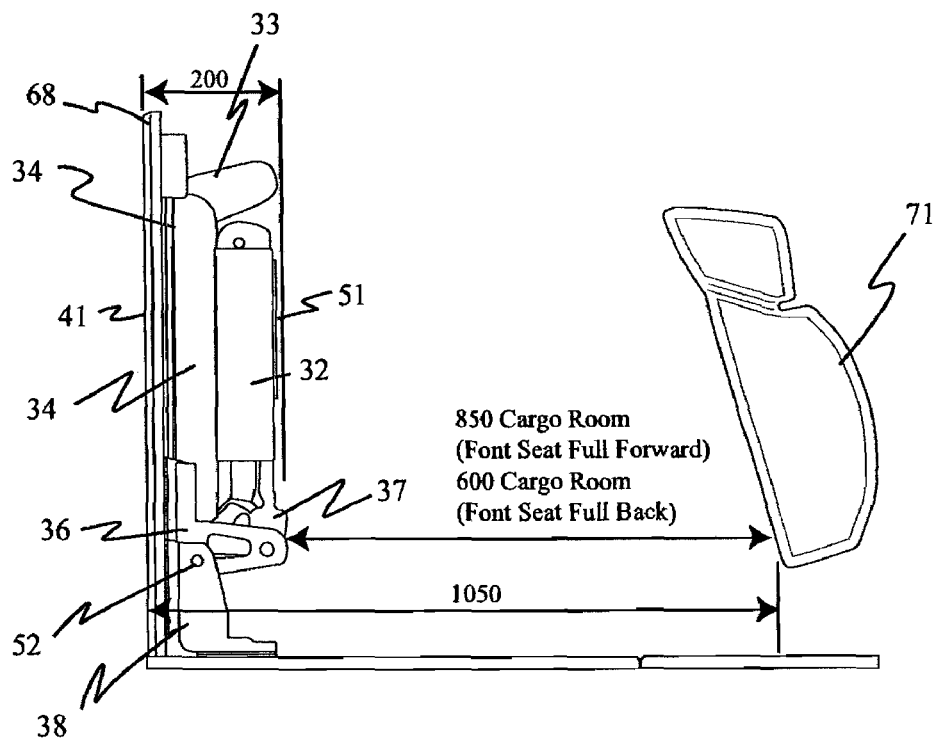

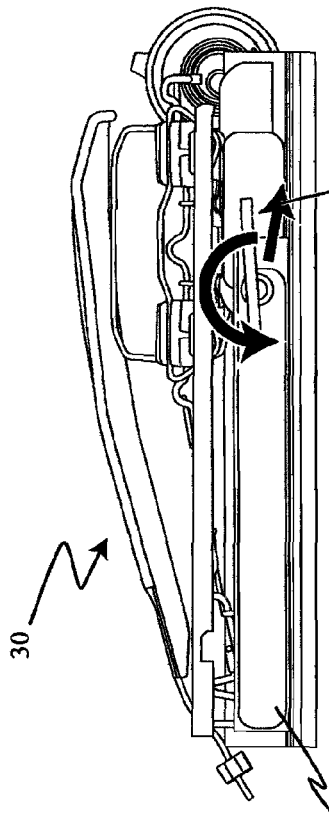
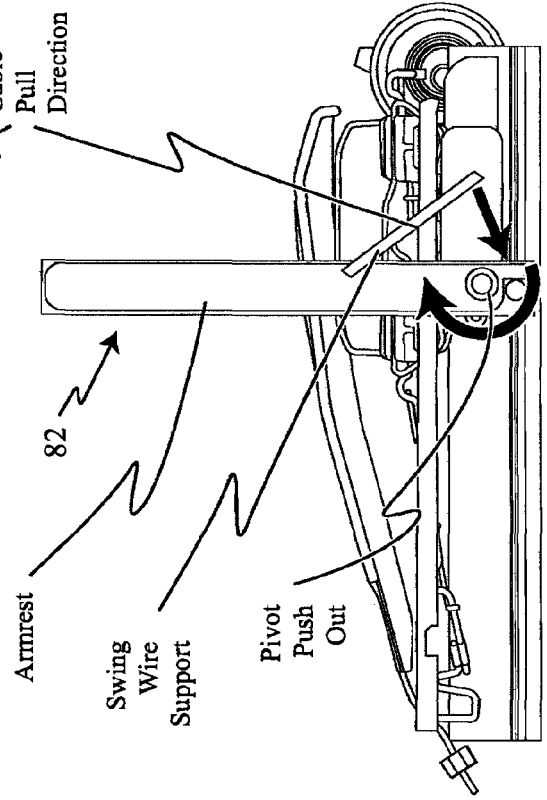
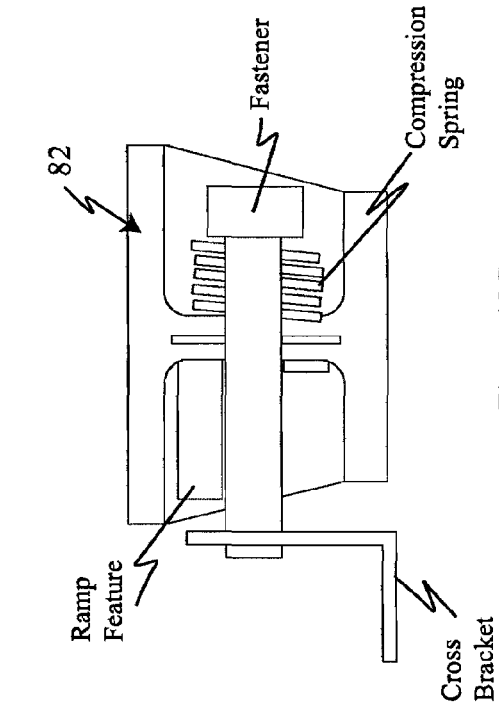
Figure 13A
Figure 13B
Figure 13C
Figure 13D

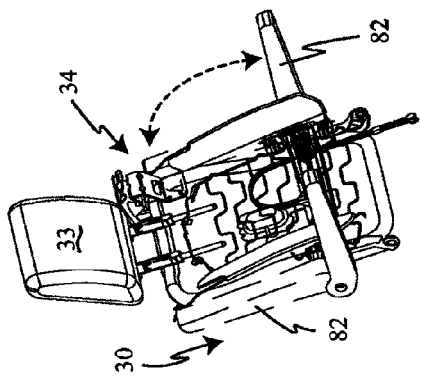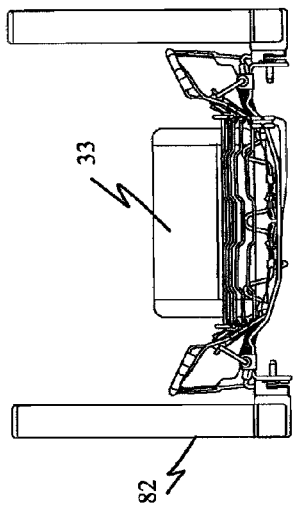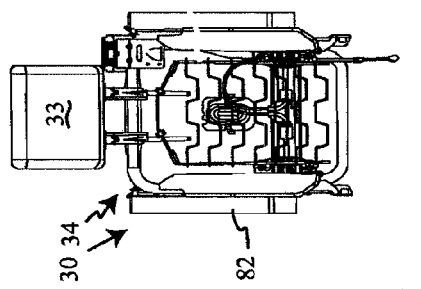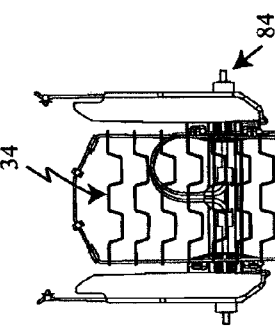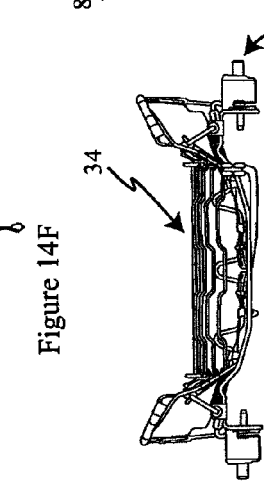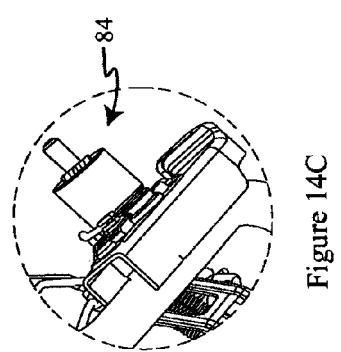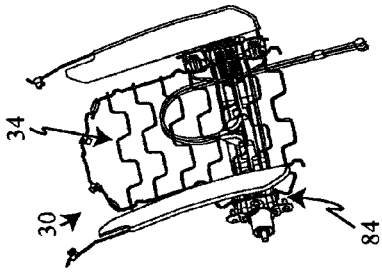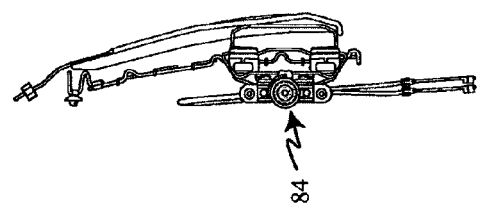

FOLD FLAT SEATING

CROSS-REFERENCE TO RELATED APPLICATIONS

This application relies upon and claims the benefit of pending U.S. Ser. No. 60/778,955, filed Mar. 3, 2006, for a Stadium Style Folding Seat.

BACKGROUND OF THE INVENTION

1. Field of the Invention

The present invention relates to folding seats for vehicles, particularly for use in the rear passenger compartment of extended cab trucks.

2. Related Art

By definition pick-up trucks are intended for hauling cargo of various sizes. Frequently the cargo to be hauled is too long for the bed of the truck. In this case, for example if hauling a standard sized sheet of plywood, the sheet must be laid down in the bed with the tailgate of the truck fully opened, or the sheet must be rested at the rearward end on top of the closed tailgate, causing the sheet to sag. Neither position of the cargo is preferred. Rather, it is best to be able to lay the entire sheet down, flat upon the bed of the truck and then close the tailgate to prevent losing the load. Thus, in an extended cab truck having a second row of seats it would be ideal to be able to do something to get the second row of passenger seats out of the way of the intended long cargo. Further, if the long cargo is also taller than the height of the truck cab there is also a need for a way to get part of the roof of the truck out of the way so that the entire cargo can be retained in the bed of the truck.

In the past, cargo vehicles having second, third, or other multiple row seating units proved to be very unpopular. The seating units were difficult to manipulate and took away valuable space both inside the passenger compartment and within the vehicle chassis area because extra, unused seats would have to be stored in a deep, recessed well in the chassis. Likewise, the seating units were not comfortable or aesthetically pleasing.

Users of such systems who wanted to maximize storage or cargo space would have to completely remove rear seats which created two associated problems. First, the seats were bulky and heavy and difficult to maneuver in the confined space of vehicle occupancy compartments. Generally, more than one person was needed to remove the known seats. Additionally, seat removal created problems because the removed seat required storage in a garage, a home, or elsewhere, taking up valuable space.

Likewise, seating units that were not removed from the vehicle, but were instead folded and stored within a well in the vehicle chassis reduced ground clearance. Ground clearance reduction in vehicles such as sport utility vehicles greatly limits the area drivers may operate the vehicles. Moreover, new vehicle space standards that will greatly limit storage space are to take effect in the very near future. Because of this, it is desirous to find a better way to manipulate and store vehicle seats in multi-row seating vehicles.

Automotive seat systems for second and third-row seat systems are known in the art. Examples are illustrated in FIGS. 8A, 8B and 8C. The known seat systems, however, often require awkward assemblies that use precious vehicle space or create storage problems. Additionally, many folding seats are complicated and expensive to manufacture and assemble, comprising many gears and/or lever arms among other components. Finally, many of the existing systems are not aesthetically pleasing or comfortable. In particular, modifications to the seats to make them have a thinner profile when folded often lead to structural trade-offs which sacrifice comfort.

One such trade-off is in the optimum torso support angle. To improve comfort a seat back is given a slight rearward angle so that the occupant is slightly reclined when seated. However, to achieve this angle, particularly when the seat back is against a wall or bulkhead as in an extended cab truck or certain types of sport-utility vehicles, requires situating the lower portion of the seat back as well as the seat base cushion forward of the wall or bulkhead. This forward placement of the seat base and the lower part of the seat back interferes with the use of the passenger compartment as cargo space, since the anchor point of the typical folding seat must stand away from the rear wall by a sufficient distance to achieve the optimum torso support angle when the seat is in the unfolded position. This spaced placement from the vehicle wall is illustrated to be the same in FIG. 8A, with the known seat in seating positions as in FIG. 8B with the known seat in upward, closed position. This stands in stark contrast to the two positions for the new stadium-style folding seat when in the open seating position of FIG. 1 as compared to the folded up position shown in FIG. 2.

SUMMARY OF THE INVENTION

In furtherance of the above advantages, the invention is, briefly, a folding seat for a-vehicle which includes a seat base fixed to an intermediate bracket, a seat back having a lower end and a support bracket fixed to the vehicle. An intermediate bracket has a first hinge point where the seat back lower end is hingedly attached to the intermediate bracket. The intermediate bracket has a second hinge point where the intermediate bracket is hingedly attached to the support bracket, and which is spatially removed from the first hinge point. Upon folding of the seat base into a vertical position, the intermediate bracket rotates on the second hinge point, which remains stationary and the first hinge point rotates upwardly and rearwardly around the second hinge point, so that the first hinge point and the lower seat back move rearwardly as the seat back and the seat base are folded into vertical orientation close to the rear vehicle wall.

In another aspect the invention is a method of folding up a seat for a vehicle. The method includes the steps of providing a seat base fixedly attached to an intermediate bracket, and providing a seat back hingedly attached to the intermediate bracket at a lower end of the seat back, wherein the seat back is hingedly attached at a first hinge point, the first hinge point being disposed above the plane of the seat base when the seat is unfolded. The method further includes the steps of providing a support bracket, the support bracket being fixedly attached to a rear wall of the vehicle, hingedly attaching the intermediate bracket to the support bracket at a second hinge point, wherein the second hinge point is below the plane of the seat base when the seat is unfolded, and folding the seat base upwardly, wherein the intermediate bracket rotates upward and the first hinge point moves towards the rear wall of the vehicle.

In yet another aspect the invention is a folding seat for a vehicle having a seat base fixedly attached to an intermediate bracket, a seat back, and a support bracket fixedly attached to a rear wall of the vehicle. The rear wall of the vehicle is disposed behind the seat, wherein a lower end of the seat back is hingedly attached to the intermediate bracket at a first hinge point on the intermediate bracket. The intermediate bracket is hingedly attached to the support bracket at a second hinge point on the intermediate bracket, which second hinge point is spatially removed from the first hinge point. The vehicle has an approximately planar cargo bed and the support bracket is hingedly attached to the vehicle at a third hinge point. The third hinge point is disposed below the plane of the cargo bed, such that upon folding of the seat base into a vertical position the intermediate bracket rotates upwardly, the first hinge point being moved rearwardly so as to move the first hinge point and the lower portion of the seat back rearwardly so that the seat back and the seat base are folded into a substantially vertical orientation. Upon folding the rear wall forwardly and downwardly into a substantially horizontal orientation with the seat disposed thereunder in a folded position, the rear wall is substantially co-planar with the cargo bed.

In still another embodiment the invention is a cargo accommodation system for a vehicle, comprising a vehicle folding seat, a moving roof panel, and an openable rear window. The folding seat comprises a seat base fixedly attached to an intermediate bracket, a seat back, and a support bracket fixedly attached to a rear wall of the vehicle, the rear wall being disposed behind the seat. A lower end of the seat back is hingedly attached to the intermediate bracket at a first hinge point on the intermediate bracket. The intermediate bracket is hingedly attached to the support bracket at a second hinge point on the intermediate bracket, the second hinge point being spatially removed from the first hinge point. The vehicle has an approximately planar cargo bed. The support bracket is hingedly attached to the vehicle at a third hinge point, the third hinge point being disposed below the plane of the cargo bed. Upon folding of the seat base into a vertical position, the intermediate bracket rotates upwards; the first hinge point moves rearwards so as to move the first hinge point and the lower portion of the seat back rearwards so that the seat back and the seat base are folded into a substantially vertical orientation. Upon folding the rear wall forward and downward into a substantially horizontal orientation with the seat disposed thereunder in a folded position, the rear wall is substantially co-planar with the cargo bed. The moving roof panel slides forward and rearward, away from and towards the cargo bed. The openable rear window comprises a pair of panels adjacent one another, each panel being hingedly attached to the vehicle at a lateral edge of the panel.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 7A is a partial schematic side elevational view of a vehicle showing the seat of the present invention in the upright seating position, with the rear cab window raised behind the new rear seats.

FIG. 7B is a partial schematic side elevational view of a vehicle showing the seat illustrated in FIG. 7A in the folded up "thin package" position to provide cargo space in front of the new seat and behind the front vehicle seat, and illustrating the truck front seat in the full forward position for maximum cargo space.

FIG. 13A is a partial cut-away view illustrating the general dimensions of an optional arm rest for the seat of FIG. 1.

FIG. 13B is a side elevational view of a portion of the seat of FIG. 1, showing the armrest in a folded-down position.

FIG. 13C is a partial enlarged cut-away view of the arm rest of FIG. 13B showing the bracket and fastening mechanism for the armrest.

FIG. 13D is a side elevational view of the seat of FIG. 13C showing the arm rest in an extended position.

FIG. 14C is a partial lower perspective view of the actuator of FIG. 14B, reduced.

FIG. 14D is a lower front perspective view of the seat of FIG. 14A, reduced.

FIG. 14E is a partial left side elevational view of the actuator mechanism of FIG. 14B.

FIG. 14F is a front elevation view of the armrest actuator mechanism of FIG. 14E.

FIG. 14G is a front elevational view of the seat of FIG. 14D.

FIG. 14H is a front perspective view of the seat back of FIG. 14E showing the arm rest actuator.

FIG. 14I is a bottom plan view of the seat of FIG. 14H.

FIG. 14J is a bottom plan view of the seat of FIG. 14G

Throughout the drawings like parts are indicated with like element numbers. For simplicity and clarity of the drawings not all elements are shown in all figures.

DETAILED DESCRIPTION OF THE PREFERRED EMBODIMENTS

The following description of the preferred embodiment(s) is merely exemplary in nature and is in no way intended to limit the invention, its application, or uses.

Figure 1:
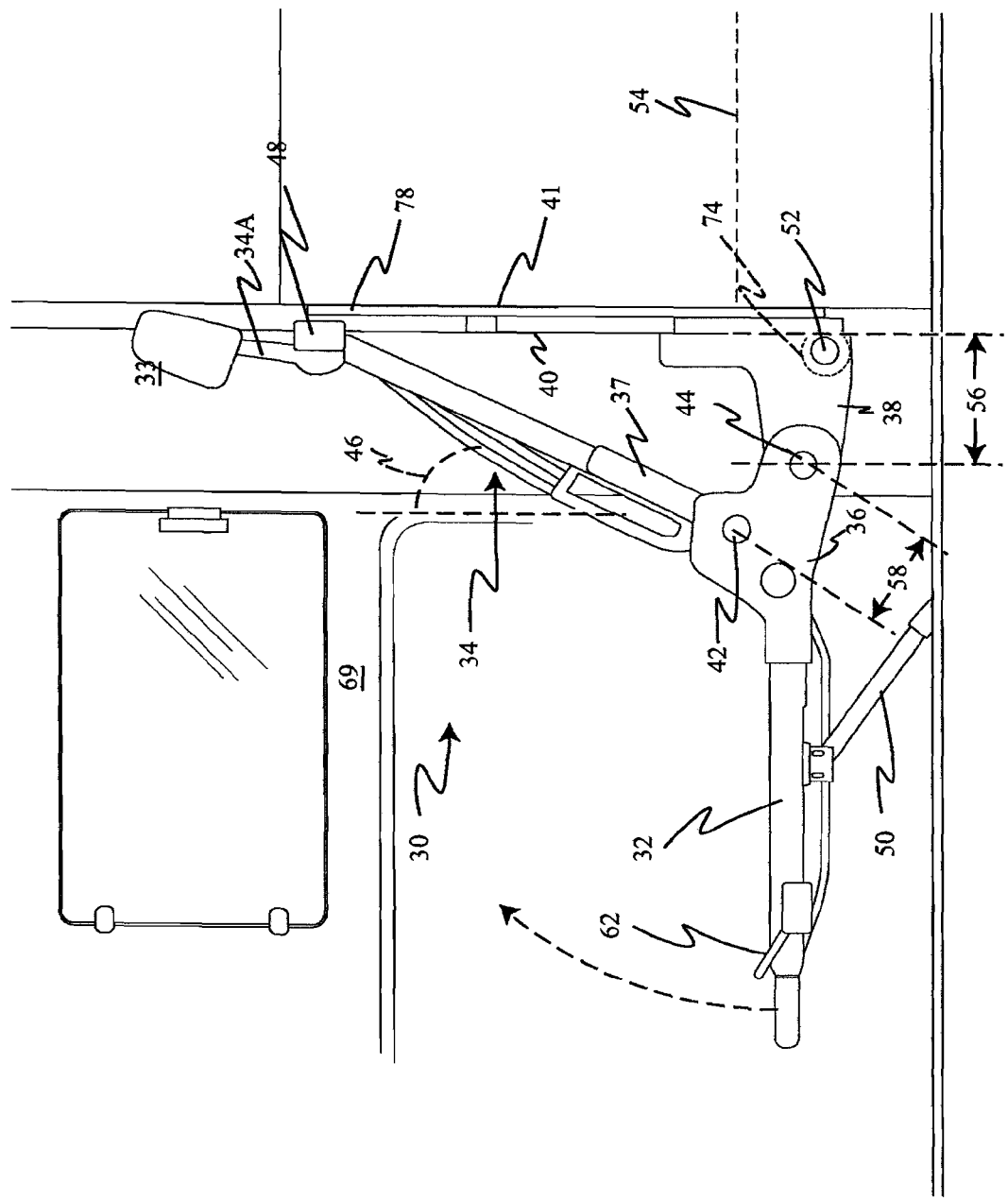
FIG. 1 is a side elevational view of one embodiment of the internal structure of a fold-down seat, constructed in accordance with and embodying the present invention, in an unfolded (seating use) position.

With reference to the figures, and initially FIG. 1, a stadium style fold down seat, generally designated 30 is constructed in accordance with the invention and includes a seat base 32, a seat back 34, a seat bracket 37 pivotally connected to an intermediate bracket 36, and a support bracket 38. It is to be understood throughout the following discussion that there may be multiple seats 30 disposed within the same vehicle V and, while ordinarily each seat 30 within a vehicle will be the same as the others, there may optionally be variations among them.

Figure 2:
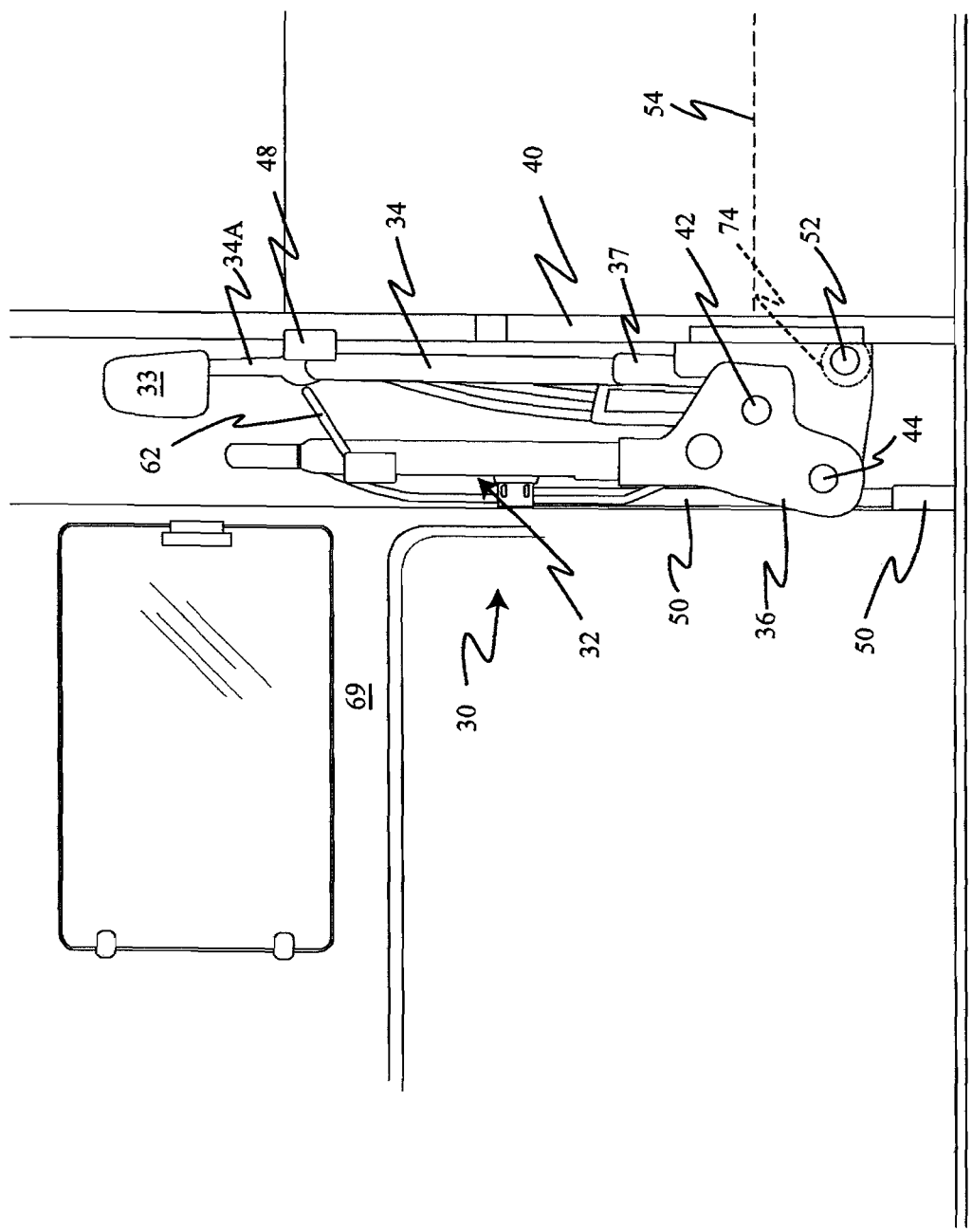
FIG. 2 is a side elevational view of the internal structure of the fold-down seat of FIG. 1 in a folded up position.

In the seat shown in FIGS. 1 and 2, seat base 32 is fixedly attached to seat bracket 37. Seat back 34 is hingedly (or "pivotally") attached at a first hinge point 42 by seat bracket 37 to intermediate bracket 36. Seat back 34 is attached to intermediate 36 preferably at a point that is separated from the plane of seat base 32, so that upon folding of seat base 32 and seat back 34 towards one another the components can be made relatively parallel to one another, even if the seat has some bulk, e.g. from cushioning or other comfort providing materials. This structure in turn permits the folded seat to assume a more compact, "thin package" form, as illustrated, for example, in FIG. 7B. Preferably, first hinge point 42 is situated above the plane defined by seat base 32, as determined when seat 30 is in the unfolded position, and seat back 34 is hingedly attached to seat bracket 37 at or near the lower end of seat back 34, as illustrated, for example, in FIG. 1.

Support bracket 38 is attached to a second hinge point 44 of intermediate bracket 36. Second hinge point 44 is preferably at or below the plane of seat base 32 as determined when seat base 32 is in the unfolded position. Support bracket 38 is fixedly attached to the vehicle in which seat 30 is installed, preferably to a rear wall 40 of the vehicle. The point on support bracket 38 that hingedly attaches to intermediate bracket 36, i.e. second hinge point 44, is preferably displaced from rear wall 40 by a first distance indicated at 56 in FIG. 1, to help position a lower end of seat back 34 away from rear wall 40, and thereby permit seat back 34 to assume an optimum comfort torso angle 46, as described below. First hinge (pivot) point 42 and second hinge (pivot) point 44 on intermediate bracket 36 are preferably separated from one another by a second distance 58, again to permit seat back 34 when in the unfolded position to assume the optimum torso angle 46.

As, however, may be desired, first distance 56 and second distance 58 can be approximately equal to one another, with second distance 58 being somewhat shorter (for example, approximately 10-20%) than first distance 56, and in one embodiment first distance 56 is approximately five inches. If desired, first distance 56 can be comparable to, but slightly less than, the thickness of seat 30 when it is folded up, so that when seat 30 is folded up into a vertical position, the folded seat 30 projects no further from rear wall 40 than support bracket 38. This is shown in FIG. 2, for example. Second distance 58 should be sufficiently long so that first hinge point 42 moves from a position near rear wall 40 when seat 30 is in a folded position (FIG. 2) to a position that is sufficiently far from rear wall 40 in the unfolded position to permit seat back 34 to recline into an optimal torso position (FIG. 1). The exact values for first distance 56 and second distance 58 will depend on factors such as the height of seat back 34 and the thickness of seat 30 when in the folded up position, as well as the desired reclining angle in the unfolded, seating position. Determining these distances is well within the capability of one skilled in the art.

In the unfolded seating position illustrated in FIG. 1 seat base 32 is approximately horizontal or preferably is slightly reclined with the end of seat base 32 that is distal (forwardly directed) to intermediate bracket 36 being slightly higher than the proximal seat base end. Seat back 34 is also preferably in a slightly reclined position, which requires that the lower end of seat back 34 and first hinge point 42 be situated spacedly away from rear wall 40. The separation distance between rear wall 40 and first hinge point 42 is a function of the desired torso angle 46 and the height of seat back 34. A suitable torso angle 46 can be between 20 and 30 degrees and in a preferred embodiment is approximately 25 degrees, although many other angles are possible and within the scope of this patent. Appropriate stops and other mechanisms are put in place to maintain the seat in the various described positions, using techniques well known to those skilled in the art.

As indicated by FIG. 2, upon upward folding of seat base 32, intermediate bracket 36 rotates upward as well, because seat base 32 is fixedly attached to intermediate bracket 36. Given the relative positions of the point of attachment of seat base 32, first hinge point 42, and second hinge point 44, as intermediate bracket 36 rotates upwardly in the directions indicated by arrows in FIG. 1), then the lower end of seat back 34 is moved closer to rear wall 40 and into an approximately vertical position shown in FIG. 2.

When seat 30 is in the unfolded position, first hinge point 42 can be forward of second hinge point 44, as illustrated in FIG. 1. Alternatively, first hinge point 42 can be substantially above second hinge point 44. In the embodiment illustrated in FIGS. 1-3, first hinge point 42 moves into a plane rearward of the vertical plane in which lies second hinge point 44 upon folding up of seat base 32 to the position shown in FIG. 2, thereby moving the lower portion of seat back 34 rearwardly, and closer to rear wall 40. In either arrangement, first hinge point 42 moves rearwardly toward vehicle wall 40 when seat 30 is folded up. If the second hinge point 44 is at or below the plane of seat base 32, as described above, when seat base 32 is folded up into an approximately vertical position, seat base 32 will be situated rearwardly of second hinge point 44. Thus the entire seat assembly when folded up occupies a space approximately as wide as support bracket 38. A useful example of the width of seat 30 when folded upright into an approximately vertical orientation, as seen in FIG. 2, is approximately 135 millimeters. In another useful example, the front to rear profile of upright folded-up seat 30, including rear vehicle wall 40, is approximately 200 millimeters, as illustrated in FIG. 7B.

As illustrated generally in FIGS. 1 and 2, seat back 34 is slidably attached to rear wall 40 by a suitable slidable connection 48, which is preferably disposed at or near the top end of seat back 34. As seat base 32 is folded and unfolded seat back 34 undergoes a limited amount of substantially vertical movement. Therefore, slidable connection 48 permits the upper end 34A of seat back 34 to move vertically, to accommodate this vertical movement, while keeping upper end 34A of seat back 34 adjacent to rear wall 40. Generally, the lower end of seat back 34 will move forwardly to some limited extend as end 34A moves substantially vertically downwardly.

Figure 4:
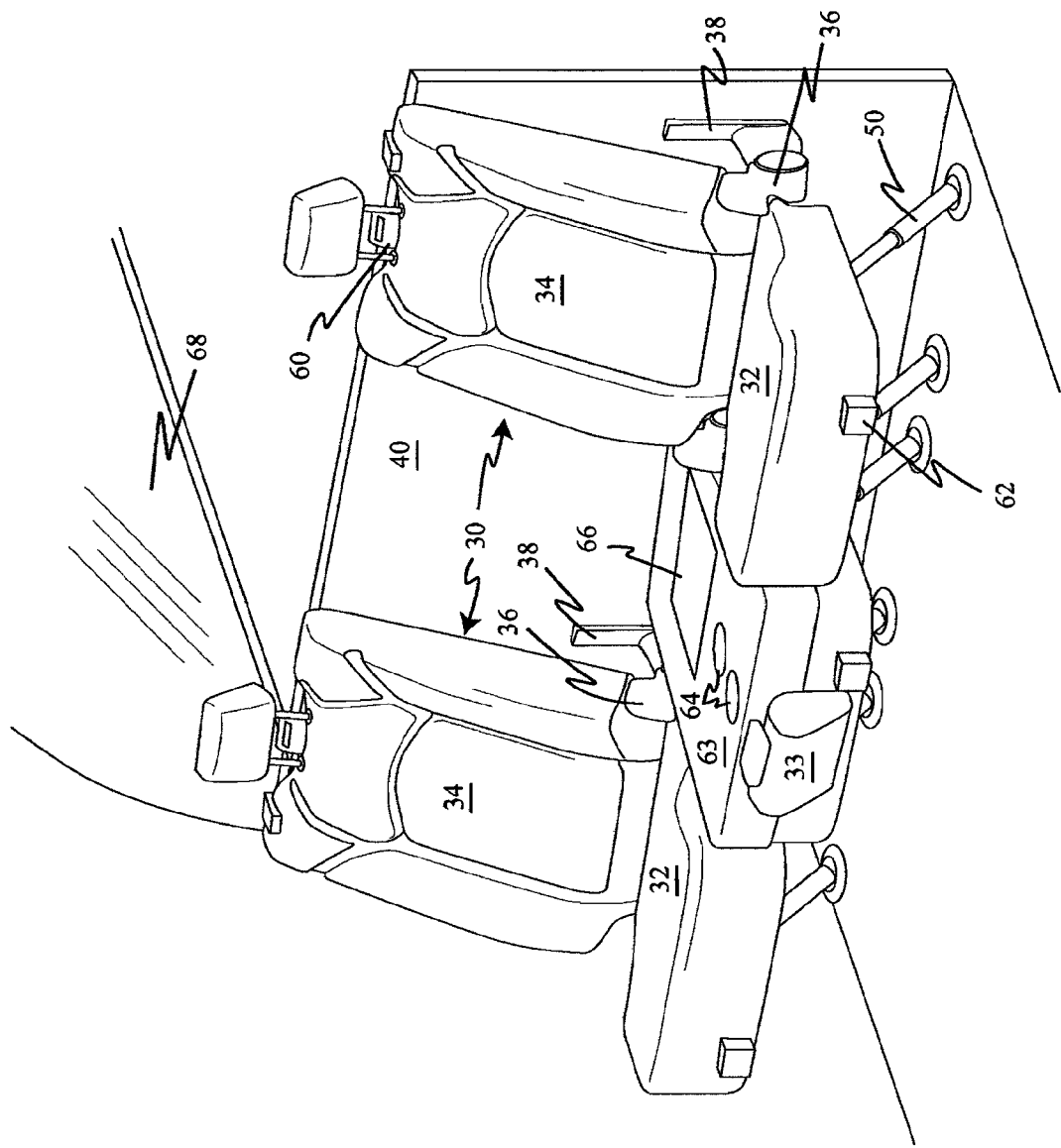
FIG. 4 is a schematic partial perspective view of the interior of a truck having an embodiment of multiple fold-down seats in accordance with the invention showing a center seat back folded down and forwardly to reveal a console having a tray and cup holder on the rear surface (upper as positioned here) of the folded down seat back.

Alternatively, seat back 34 can be either not attached at all, or can be releasably attached to rear wall 40, for example via a slidable connection 48 that can be disconnected if desired, so that a seat back 34 can be folded downwardly independently of any adjoining seat and independently of rear wall 40 (discussed further below). As shown in FIG. 4, seat back 34, if folded down, can serve as a tray or console 63 for use by the occupants of any adjoining seats. Console 63 can have options such as cup holders 64 and a spill proof tray 66 integrated therein. Optionally, seat base 32 can be initially folded up and locked into position relative to seat back 34 before seat 30 is folded down as a unit, either with or without folding down rear wall 40 at the same time. In this manner the seat back and seat cushion are physically held together so as not to permit the console portion to be inadvertently separated.

Seat base 32 can be supported by a pneumatic or hydraulic piston 50 such as is shown, for example, in FIGS. 1, 2, 4, 15A, 16A, 16B and 17A-17D. Piston 50 can be selectively moved, for example as to the position shown in FIG. 1. Piston 50 is pivotably anchored at a point directly below support bracket 38 and as a result does not increase the overall depth of seat 30 when in the upward folded position shown in FIGS. 2 and 15A. Piston 50 can be anchored at a point directly below the forward edge of support bracket 38, so that as seat base 32 is folded up piston 50 can assume an approximately vertical position (e.g. FIGS. 2 and 17A) without being obstructed by other parts of seat 30. For the same reason, the other end of piston 50 can be pivotably attached to the underside of seat base 32. Preferably, although not necessarily, there are two such pistons 50 per single-person seat 30.

Figure 8A:
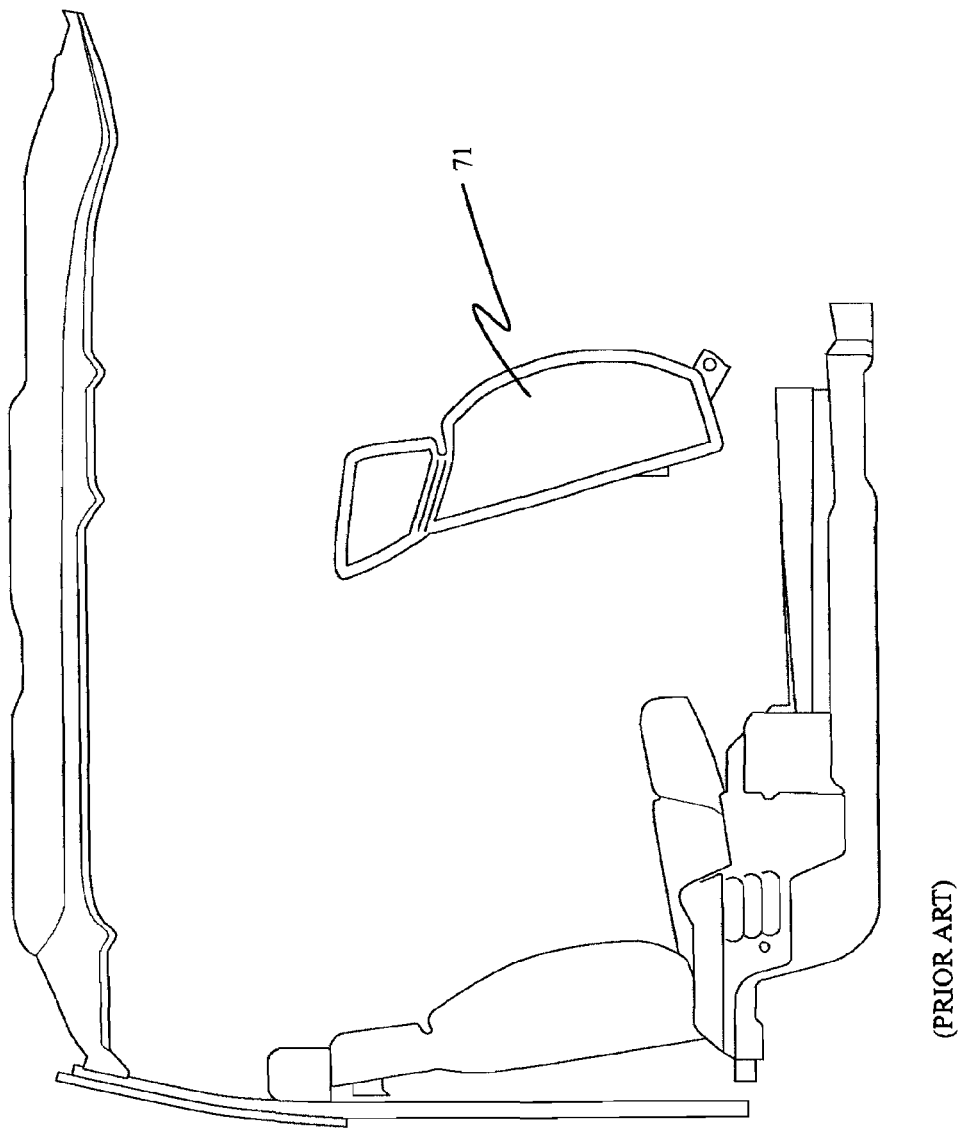
FIG. 8A is a partial schematic side elevational view of a truck having a conventional rear seat in the upright seating position and the front seat in the full forward position.
Figure 8B:
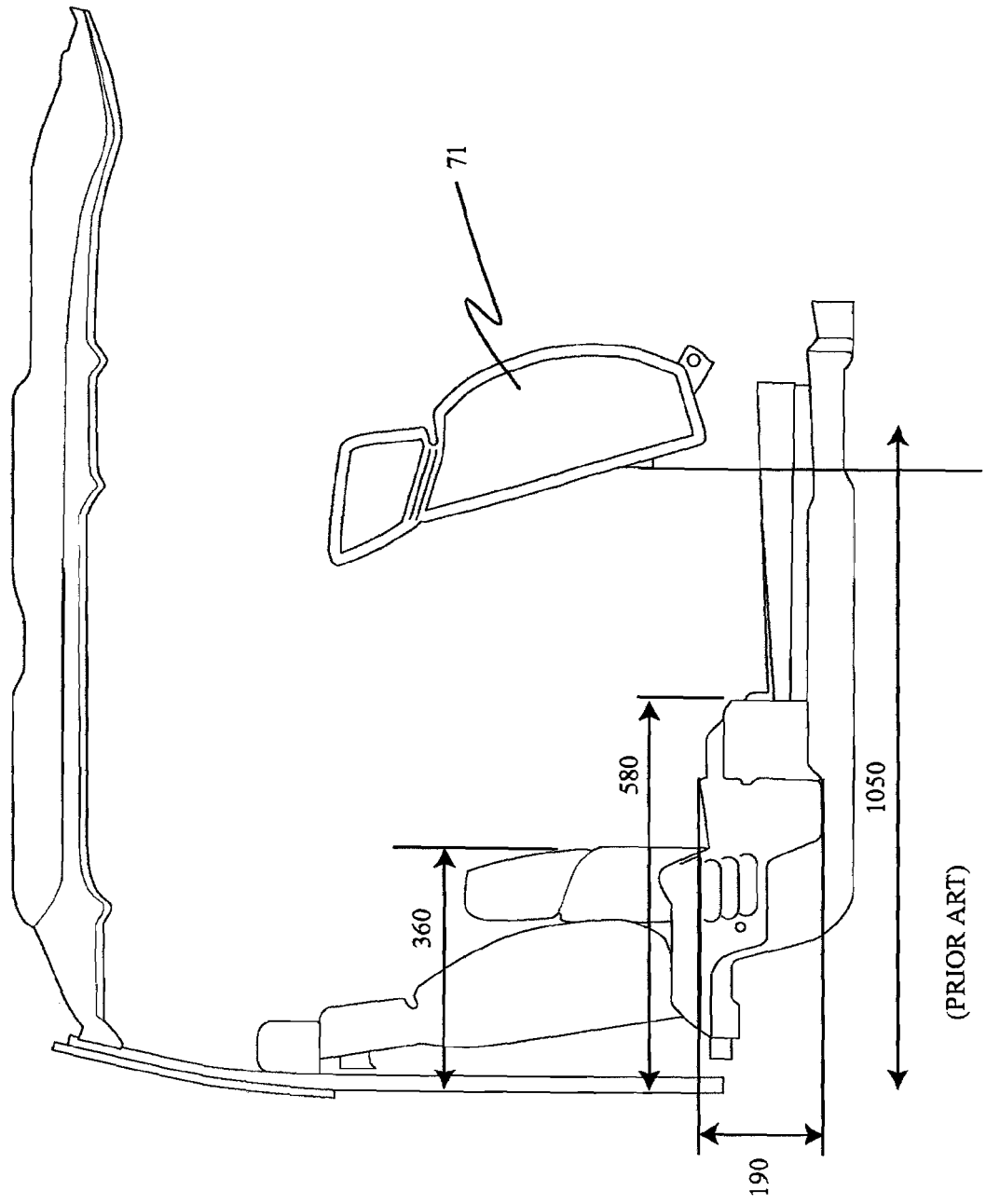
FIG. 8B is a partial schematic side elevational view of the truck of FIG. 8A showing the conventional rear seat in the seat-closed, folded up position and the front seat in full forward position, to illustrate the relative amount of space available between the front and rear seats, as compared to the seat positions of FIG. 8A.
Figure 8C:
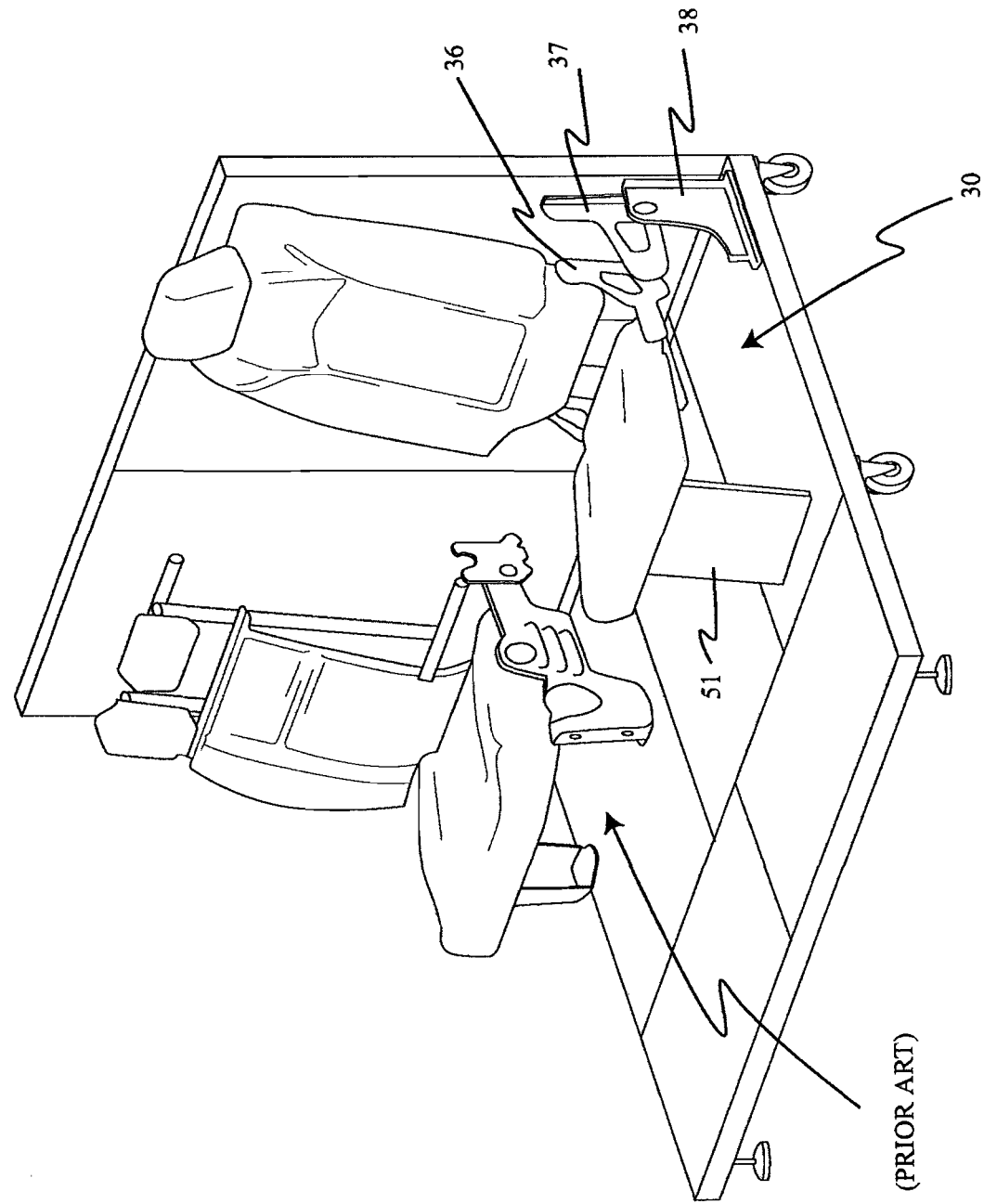
FIG. 8C is a partial schematic perspective view illustrating a conventional truck rear seat on the left of the figure as compared to an embodiment of the new stadium style fold up seat of the present invention on the right of the figure with both seats in the unfolded, seating position.

Alternatively, as illustrated in FIGS. 7A, 7B and 8C, for example, a retractable leg 51 can be pivotably attached to the underside of seat base 32 to provide support when seat 30 is unfolded. Upon folding up of seat 30, leg 51 is pivoted into a position approximately parallel to the plane of seat base 32 and approximately perpendicular to the floor of the vehicle, as shown in FIG. 7B. Leg 51 can be biased with a spring (not shown) towards the deployed position in which leg 51 is normal to seat base 32. Alternatively, the leg can be manually moved in and out of the seat support position.

If desired, as seat 30 is folded upwardly a known cable mechanism (not shown) can pull leg 51 toward the underside of seat base 32, pulling against the spring tension, until leg 51 is approximately parallel to seat base 32. In that case, when seat base 32 is unfolded from the vertical stadium position to the deployed seating position the cable is released, permitting the spring mechanism to pull leg 51 into the fully deployed position approximately perpendicular to and beneath seat base 32. Preferably leg 51 is fully deployed before seat base 32 is completely unfolded, i.e. it is fully deployed at a point where seat base is at about 90% or the distance between the completely folded-up to the completely unfolded positions, so that leg 51 meets the vehicle floor squarely as seat base 32 is folded down.

In a preferred embodiment the bottom end of leg 51 engages into a catch or detent mechanism built into the vehicle floor when seat base 32 is completely deployed. By snapping leg 51 into a catch mechanism (not shown) in the floor, leg 51 will be made stiffer and better able to support seat base 32, while also preventing seat 30 from rattling in the event there is no seat occupant. The catch mechanism is made to be easily releasable by pulling up on seat base 30, preferably by grabbing a handle mounted near the front edge of seat base 32. Optionally, the handle itself triggers release of latch mechanisms, leading to folding of seat 30.

A variety of latch mechanisms well known to those skilled in the art, can be employed to keep seat base 32 and seat back 34 in the folded or unfolded position, as necessary. Levers 62 can be used to activate these latch mechanisms and can be located at convenient positions on seat back 32 and seat base 34.

Figure 9A:
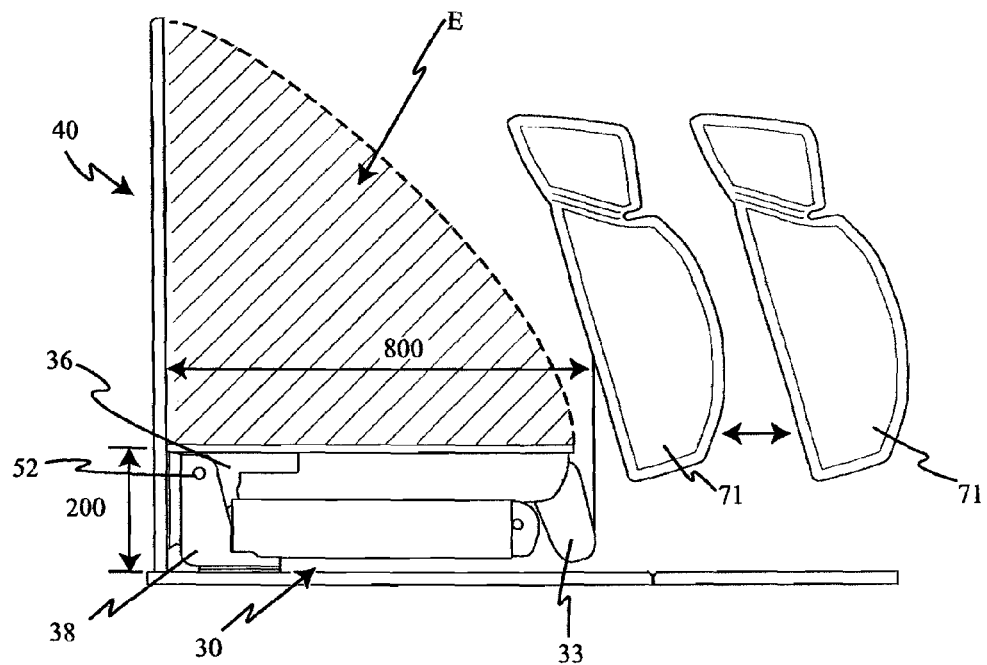
FIG. 9A is a schematic partial side elevational view of a vehicle showing the relative front seat positions full forward and full rearward relative to the positions of the rear seat in the closed, folded down stadium position, with the rear seat back substantially horizontal and parallel to the vehicle bed.
Figure 9B:
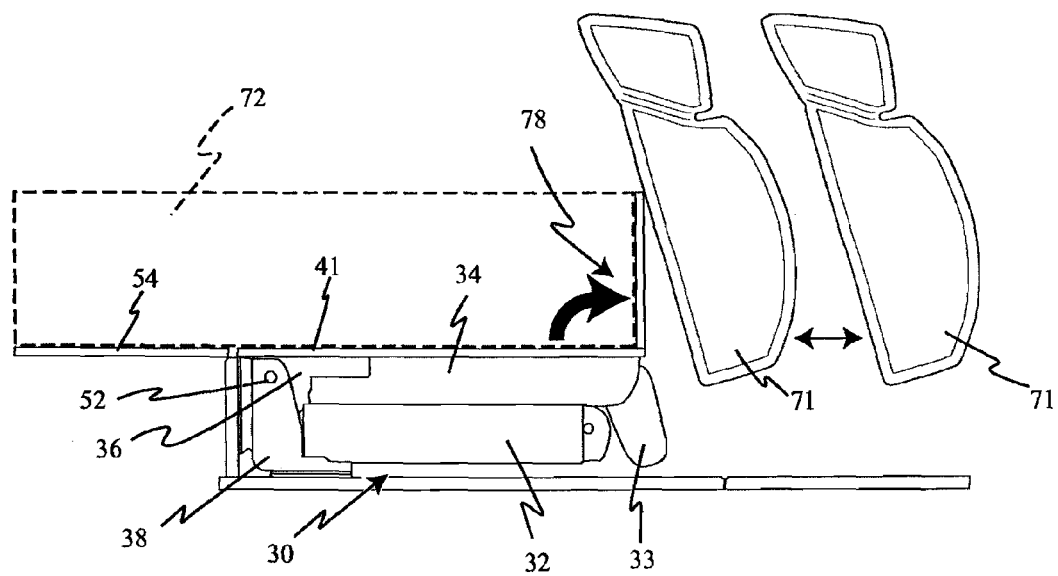
FIG. 9B is a schematic partial side elevational view of the vehicle of FIG. 9A showing the position of the cargo stop wall which flips upwardly and forwardly from the rear seat back relative to the back of the vehicle front seat to protect passengers from the cargo load.
Figure 10C:
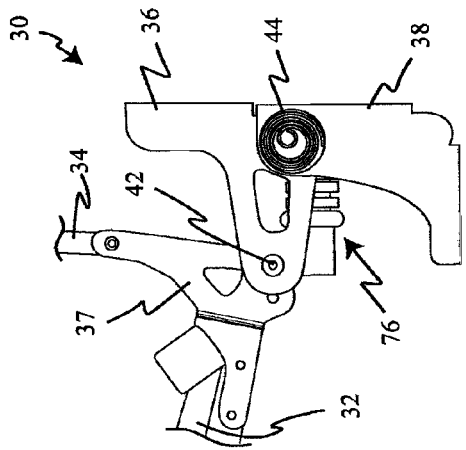
FIG. 10C is a partial left side elevational view of the seat of FIG. 10A showing the seat down in the seating position and indicating the powered actuator for the stadium position.
Figure 10F:
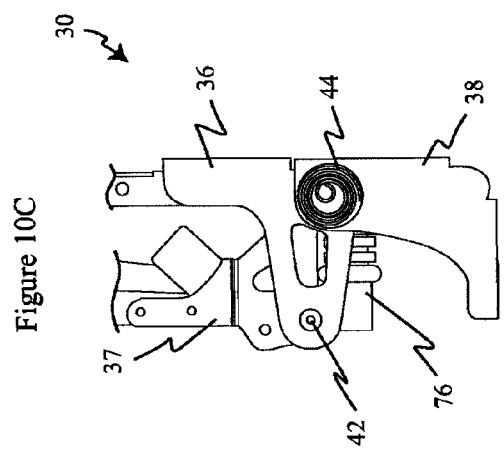
FIG. 10F is a partial left elevational view of the seat of FIG. 10D in the stadium position with the actuator powered therefor.
Figure 10B:
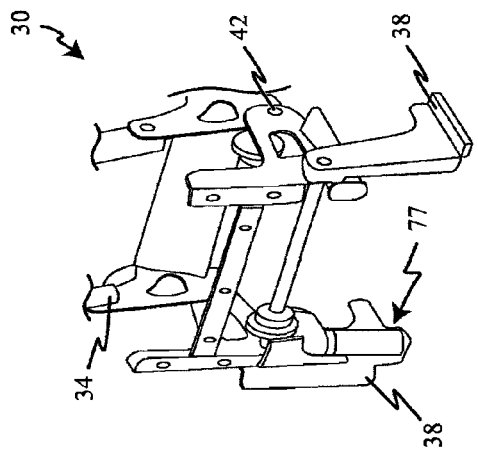
FIG. 10B is a partial right rear perspective view of the seat of FIG. 10A showing the powered actuator for the fold flat seating position.
Figure 10E:
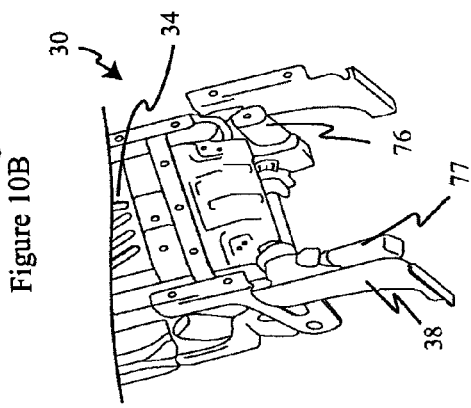
FIG. 10E is a partial lower left rear perspective view of the seat of FIG. 10D showing an actuator powered for the stadium position, as in FIG. 10A.
Figure 10A:
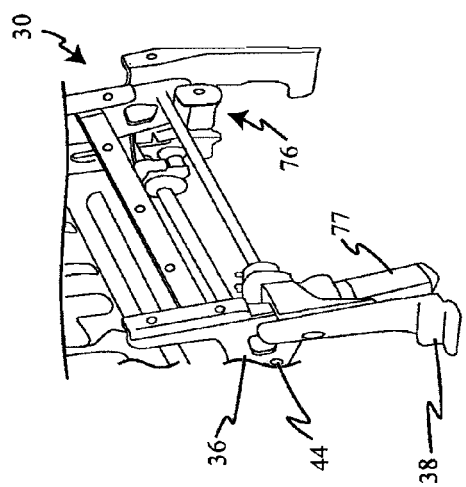
FIG. 10A is partial left rear perspective view of a fold up stadium-style seat constructed in accordance with the present invention in the open, seating position, showing a powered actuator, the actuator being in the deployed, powered position.
Figure 10D:
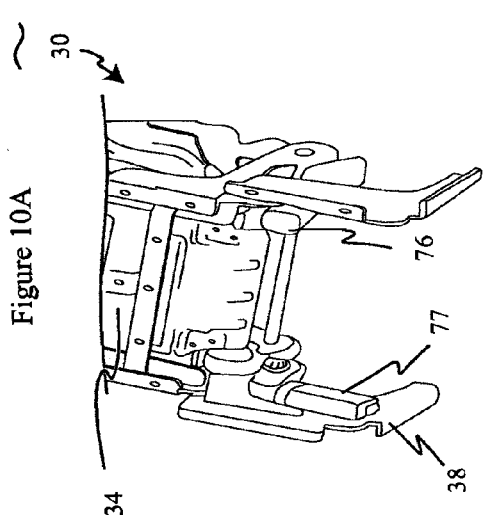
FIG. 10D is a partial lower right rear perspective view of the stadium fold flat seat of the present invention showing the actuator powered for the fold flat seat position, as in FIG. 10B.
Figure 11C:
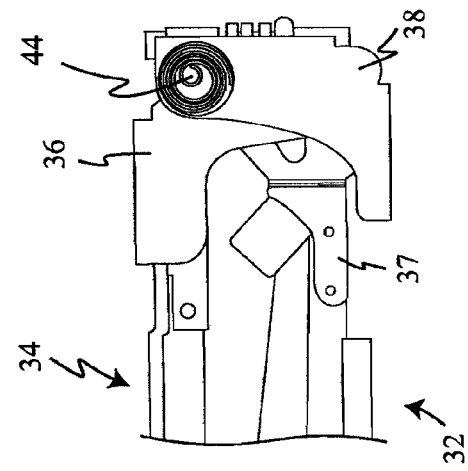
FIG. 11C is a side elevational view of the seat of FIG. 11A.

As shown, for example, in FIGS. 9A and 9B, in preferred embodiments of the new vehicle seat 30 there is a headrest 33 attached to the top portion of seat back 34. Upon folding down of seat back 34, headrest 33 is folded into a more compact form, either by rotation or by sliding of headrest 33 towards seat back 34, or both. By downwardly and forwardly folding headrest 33 the overall length of the folded seat back 34 is made shorter, which helps the folded seat to fit into the envelope E, illustrated in FIG. 9A of space E behind the corresponding front seat when seat 30 is in the folded flat, seat closed downward stadium position for storage behind the vehicle front seat, as illustrated in FIG. 9A. In one embodiment headrest 33 folds downwardly and forwardly as seat 30 is folded up or down. Upon unfolding of seat 30, headrest 33 then automatically returns to its original passenger use position and can be held in place by a detent or stop mechanism of any suitable variety. Thus a latch mechanism is not necessarily needed to lock headrest 33 in place, since the seat occupant's head will push headrest 33 against the stop mechanism, e.g. such as is shown at 60 in FIG. 4, and thereby provide the necessary rearward stability to headrest 33.

As illustrated in FIG. 9A, folding down of headrest 33 reduces the envelope of space E that is required to fold down seat 30. This may even permit seat 30 to be folded down when the front seat, such as the driver's seat in the front of the vehicle, is in its full rearward position. For this reason it is preferable to fold seat base 32 upwards before folding down rear wall 40, causing headrest 33 to retract into its more compact position before seat 30 and rear wall 40 are folded down and thereby minimizing the envelope of space required, as shown in FIG. 9B. Otherwise if headrest 33 is in the process of retracting as seat back 34 is being folded down, headrest 33 may not be in its most compact position as it passes the backside of the front seat, thereby requiring a larger envelope of space for the folding of seat 30.

Figure 15A:
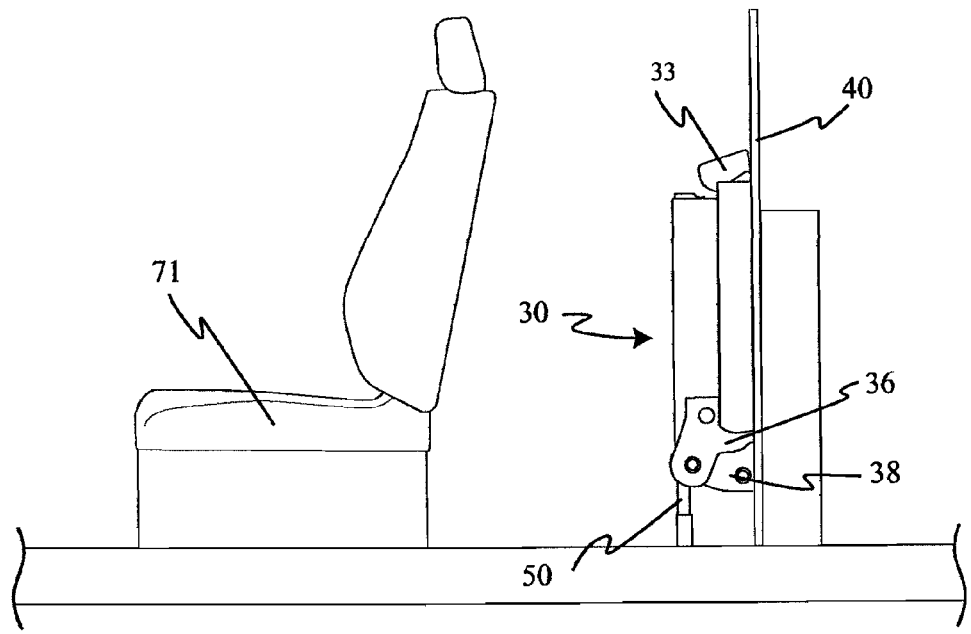
FIG. 15A is a partial side elevational view of a vehicle showing the seat of FIG. 4 in the upright position.
Figure 15B:
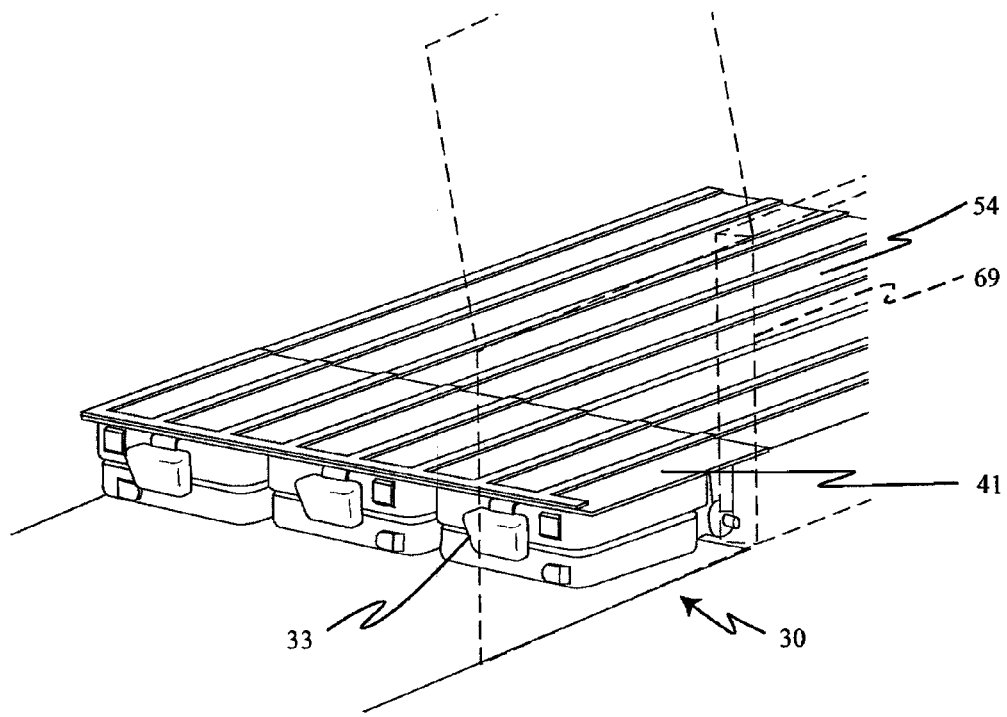
FIG. 15B is a perspective view of the vehicle shown in FIG. 15A in the folded flat position beneath the bed of the vehicle.
Figure 16A:
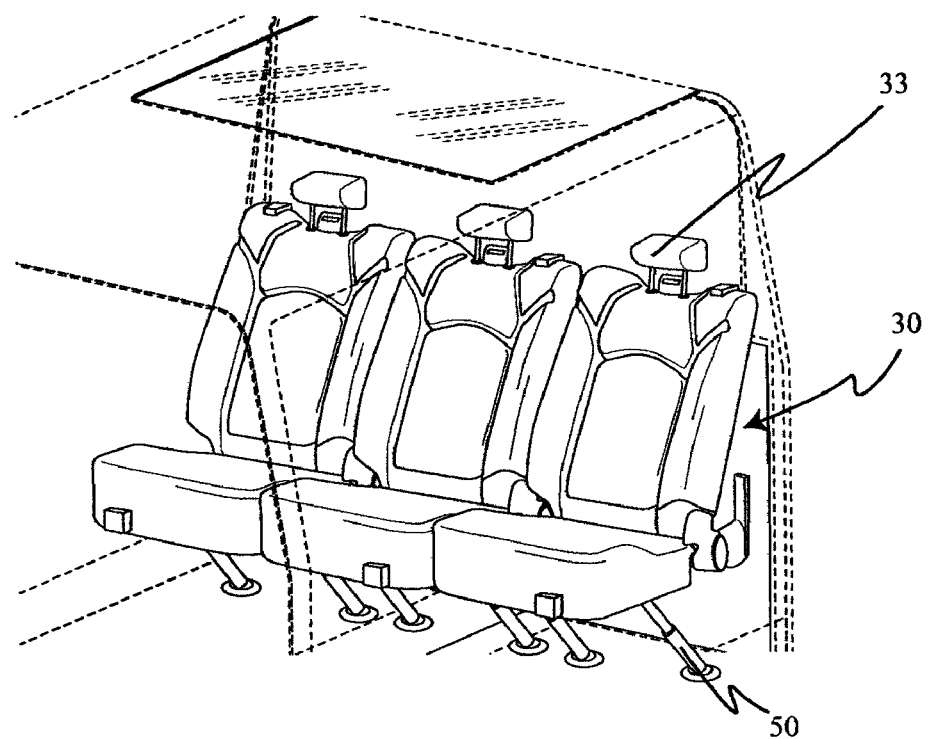
FIG. 16A is a perspective view of the vehicle seat shown in FIG. 15B in the upright sitting position and the headrests partially removed from the storage position.
Figure 16B:
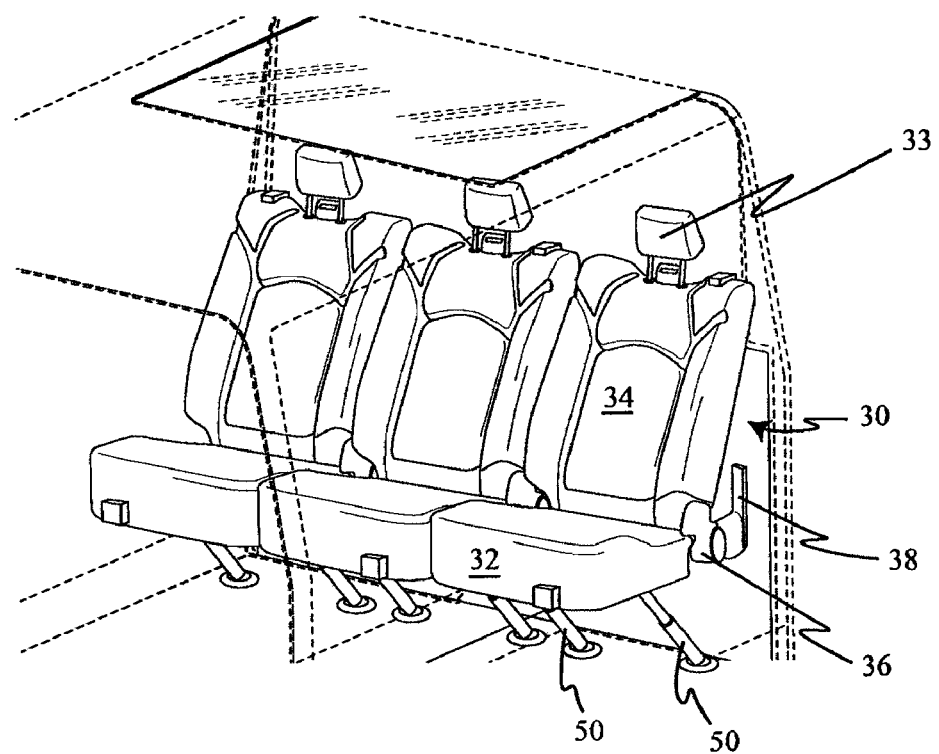
FIG. 16B is a perspective view consistent with FIG. 16A, but showing the head rests moved upright for use by a passenger.
Figure 17A:
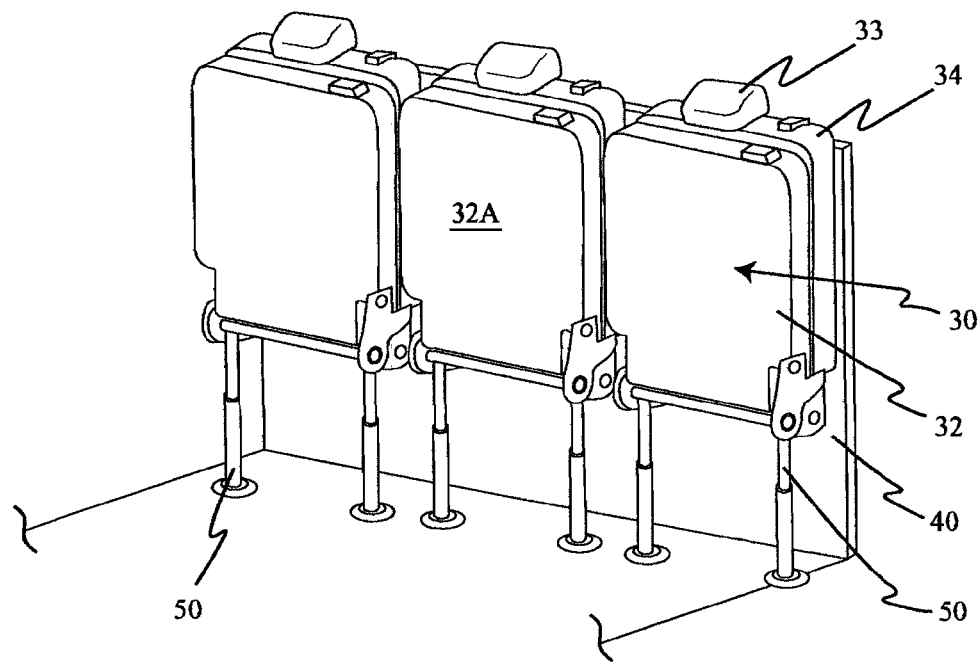
FIG. 17A is a perspective view of the seat shown in FIG. 16A with the headrests in the completely retracted position, as for storage, and the seats in the stadium upright position.
Figure 17B:
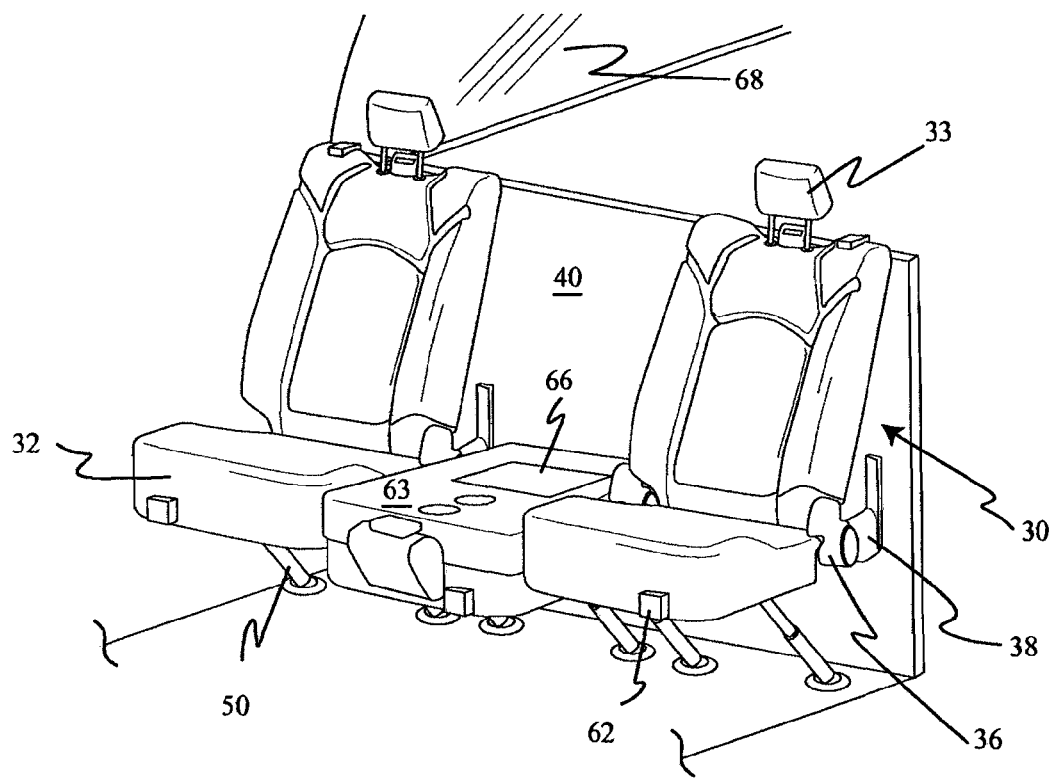
FIG. 17B is a perspective view of the seats of FIG. 16B, showing a center seat folded downwardly for use as a console and illustrating the back vehicle wall positioned for protection of the passenger cabin from cargo.
Figure 17C:
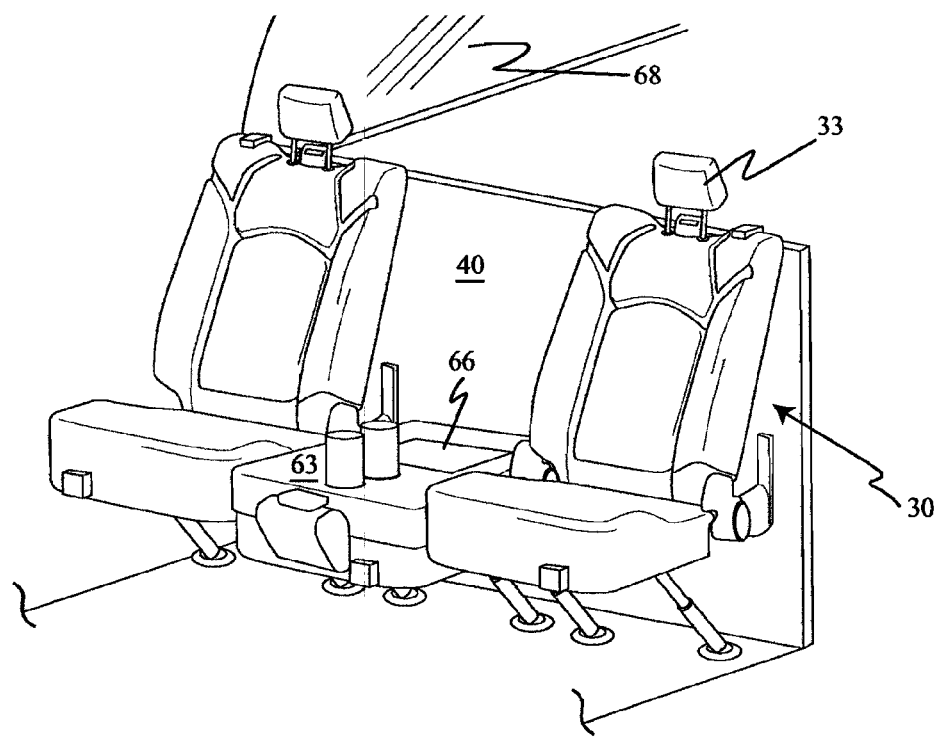
FIG. 17C is a perspective view consistent with FIG. 17B, but showing the console in use.
Figure 17D:
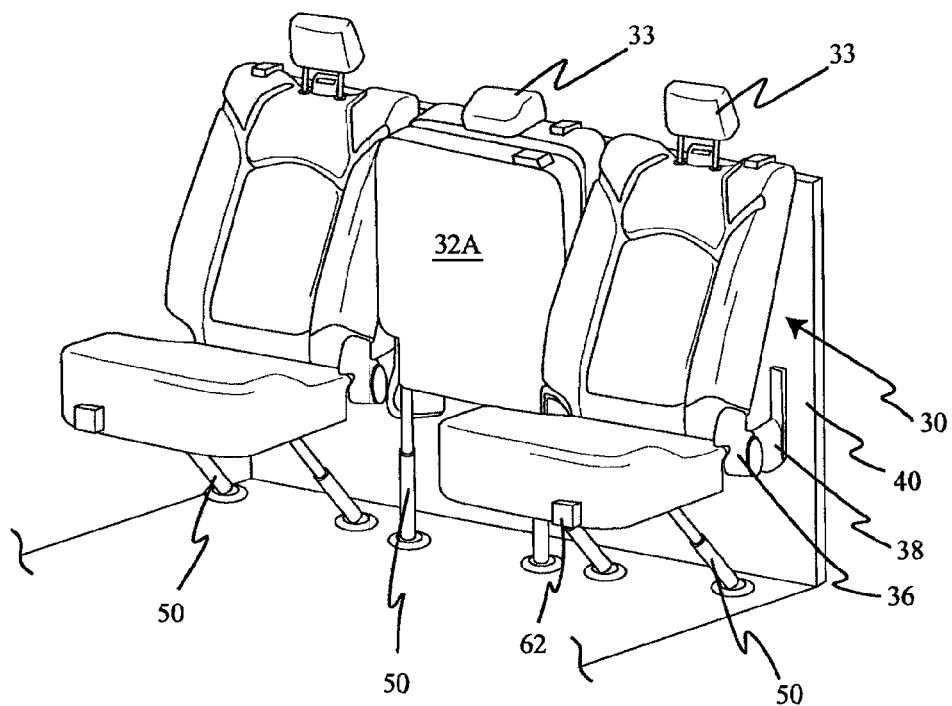
FIG. 17D is a perspective view consistent with FIG. 17C but showing the center seat folded up to stadium position and illustrating the position of hydraulic piston activated.

Further regarding the headrest 33 of the new seat 30, attention is drawn to FIGS. 15A, 15B, and 16A, 16B, as well as FIG. 17A-17D. FIGS. 15A and 15B show headrest 33 from different angles, in the collapsed position, as it must be before folding the seats 30 forwardly to store beneath the truck bed. FIG. 16A shows the headrest 33 partially extended, as the seats have just been raised to the seating position. FIG. 1B shows headrests 33 tilted upwardly and fully extended for use by a seat occupant. FIG. 17A illustrates headrests 30 fully collapsed on upwardly folded seats. FIGS. 17B and 17C show the headrests for two seats in the extended occupant use position, but the center seat headrest fully collapsed because the center seat back is folded forwardly and downwardly for use as a console 63. In FIG. 17D the center seat is positioned folded, but upright and the center seat headrest is still in the collapsed position.

Figure 3:
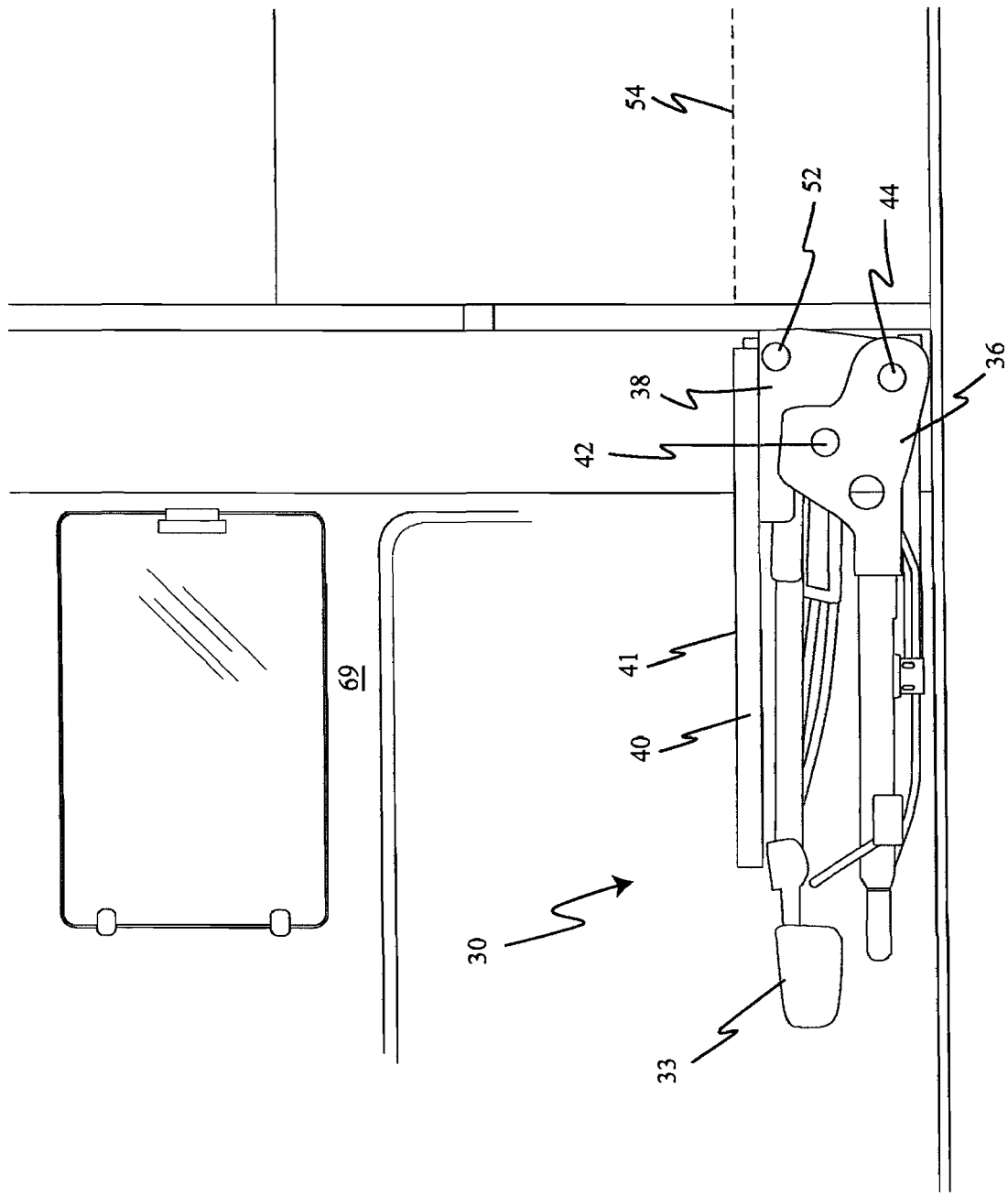
FIG. 3 is a side elevational view of the internal structure of a fold-down seat of FIG. 1 in a folded down position with the rear vehicle wall folded down forwardly over the seat.

There is also a third hinge point 52 at which support bracket 38 pivotably attaches to a fixed portion of the vehicle, preferably at a point at or below the plane of a cargo bed 54 on the rear of the vehicle, as illustrated in phantom in FIGS. 1 and 3. As an alternative to the first embodiment shown, the support bracket 38 supports third hinge point 52, but the support bracket 38 is attached to the floor of the vehicle and to a lower, fixed portion of the vehicle's rear wall that is below the level of cargo bed 54, as shown in FIGS. 7A, 7B and 9A, 9B. Support bracket 38 is fixedly attached to rear wall 40, and pivotally attached at point 52 to intermediate bracket 36, which in turn is fixed to a lower portion of wall 40, wherein rear wall 40 in this embodiment moves pivotably with respect to the remainder of the vehicle. As shown in the embodiment of FIG. 7B, seat base 32 is folded up into a stowed position as described above, such that seat base 32 and seat back 34 are approximately vertical and are substantially parallel to one another as well as to rear wall 40. With reference to FIGS. 9A, 9B, the folded seat 30 is then pivoted forwardly and downwardly at third hinge point 52 so that the portion of rear wall 40 that is above third hinge point 52 and which is fixedly attached to intermediate bracket 36 rotates along with the folded seat 30 to provide a forward extension of vehicle bed 54.

The backside 41 of rear wall 40 is preferably covered with material similar to that which covers cargo bed 54, such that the folded-down rear wall 40 becomes part of and extends the length of cargo bed 54. Further, third hinge point 52 is preferably made at a point just below the plane of cargo bed 54, as seen in FIG. 1, so that when rear wall 40 is folded down as described, the backside of rear wall 40 is substantially coplanar, or flush, with cargo bed 54. This relationship of vehicle cargo bed 54 to the horizontal back side 41 of seat back 34 can be seen in FIGS. 18A and 18B, for example. Third hinge point 52 must be situated high enough above the floor of the vehicle so that when rear wall 40 is folded down completely, support bracket 38 does not hit the floor. If preferred, the folded-down rear wall 40 can be either above or below the plane of cargo bed 54.

Rear wall 40 can be made as a single unit approximately equal to the full width of cargo bed 54, or rear wall 40 can be split into two, three, or more sections corresponding to the width of each seat 30. If preferred, each of these sections can be structured so as to be capable of being folded down individually, or together as a group.

In some embodiments springs 74 (indicated in phantom in FIGS. 1 and 2) are added at hinge points 42, 44, and/or 52 using methods known to those skilled in the art, to assist lifting of seat 30 during folding and unfolding operations. This is especially desirable at third hinge point 52 given that rear wall 40 and seat back 34 must be lifted together when unfolding from the completely folded down configuration. In other embodiments motorized actuators 76 are added at hinge points 42, 44, 52, with or without the assistance of springs, to permit hands-free folding and unfolding of seat 30 into various configurations. Useful examples of such actuator arrangements are indicted at 76, 77 in FIGS. 10A-10F and 11A-11C, wherein 76 indicates a powered actuator for the stadium position of seat 30 and 77 indicates the powered actuator for the fold flat position of seat 30.

Figure 5A:
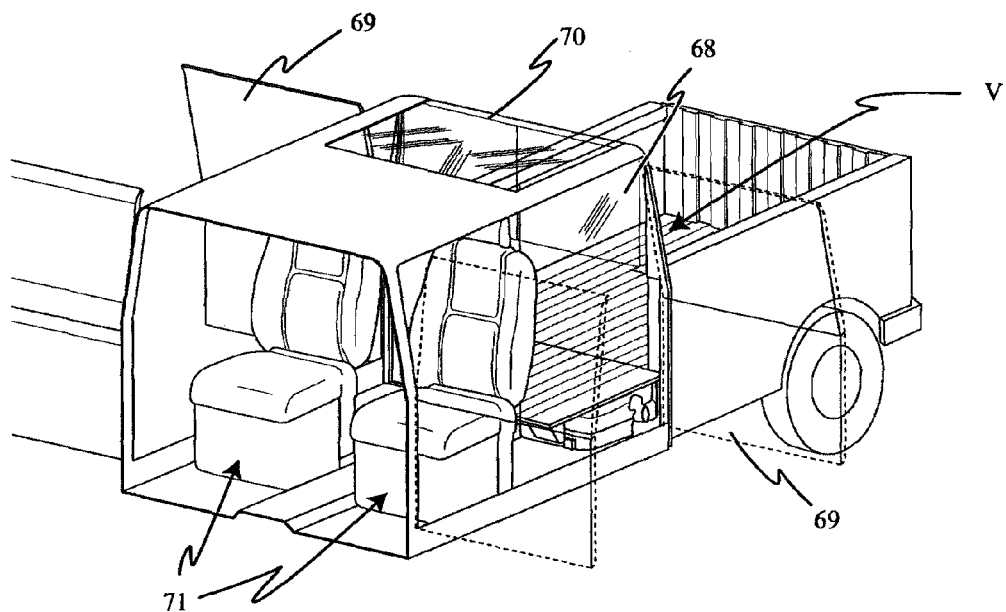
FIG. 5A is a schematic partial perspective view of a truck having the rear seats of the present invention folded down in flat storage stadium position and with the vehicle rear doors open.
Figure 5B:
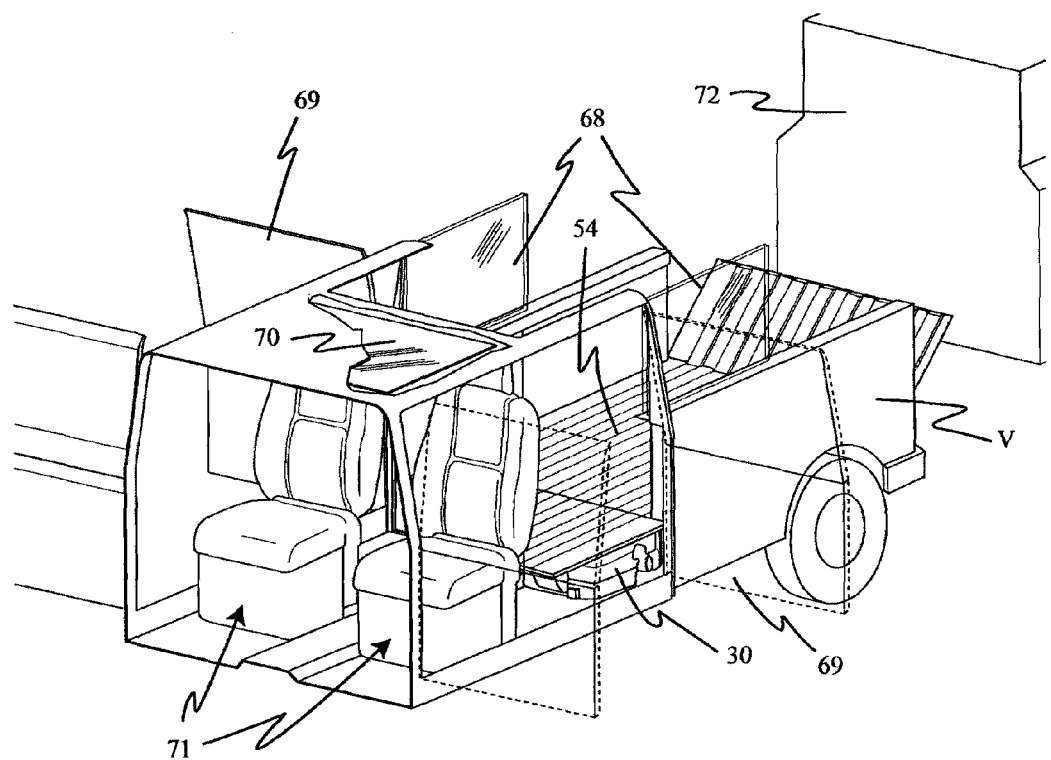
FIG. 5B is a schematic perspective view of the truck of FIG. 5A with the rear portion (roof panel) of the vehicle roof open to accommodate excessively tall cargo in the cargo bed area created by folding the rear vehicle seats down into storage position beneath the truck floor.
Figure 5C:
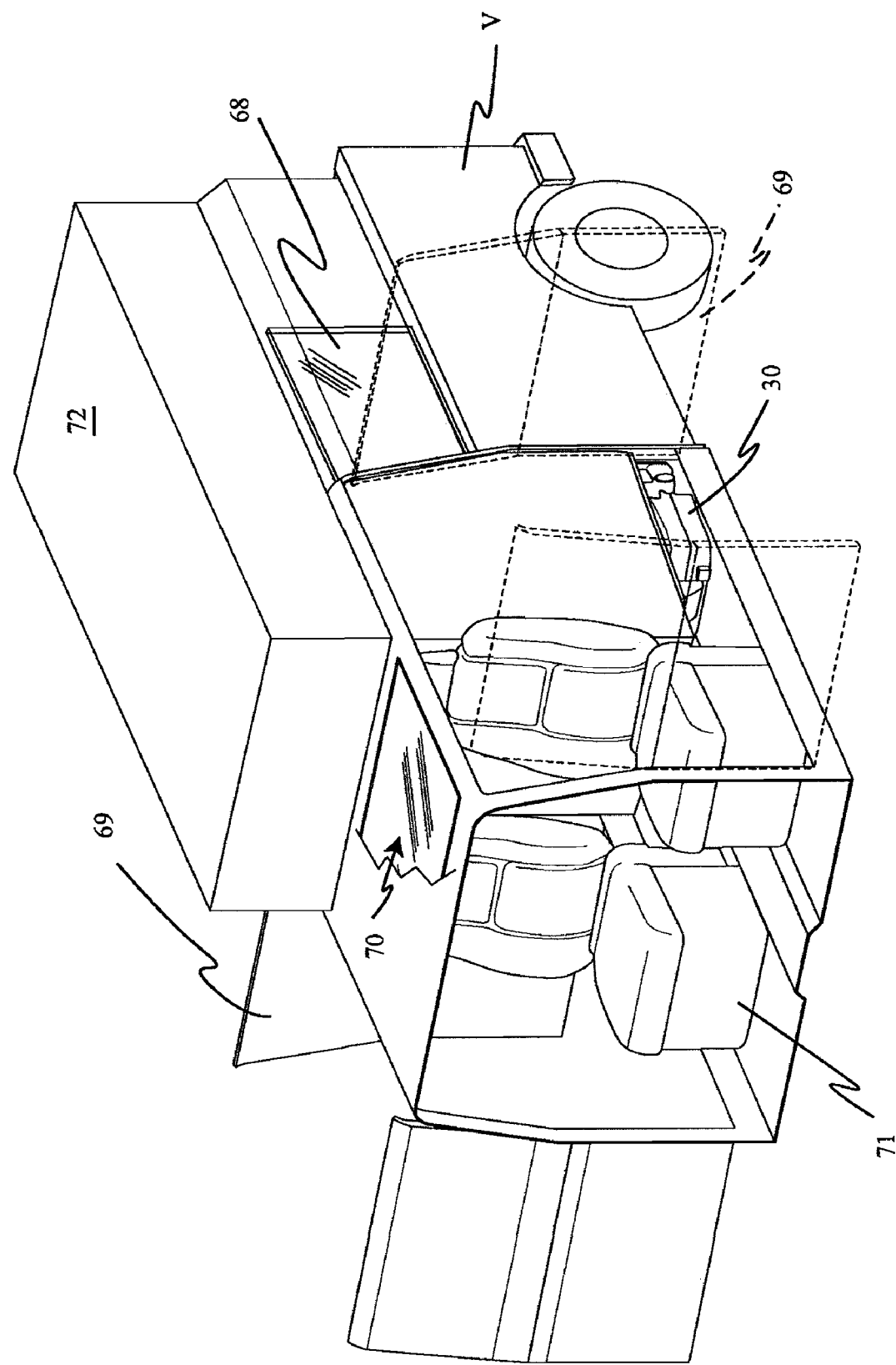
FIG. 5C is a schematic perspective view of the truck of FIG. 5A with the excessively tall cargo in the truck bed and the new seats folded down beneath the forwardly directed end of the cargo.

To enlarge the space available for loading cargo 72, especially taller items, into the extended cargo bed formed by folding down seat 30 and rear wall 40, the vehicle rear window 68 and roof panel 70 above the folded seats 30 can be made to fold or slide out of the way, as indicated in FIGS. 5A, 5B, 5C. In one embodiment the rear windows are hinged on the sides and open in the center as a pair of doors (FIGS. 5A, 5B, 5C). Alternatively, rear window 68 can slide up and down, retracting into rear wall 40, as indicated in FIGS. 7A, 7B, so that seat 30 and rear wall 40 can be folded down and forwardly to expand the cargo bed, to the position illustrated for example in FIG. 15B.

To facilitate opening and closing of rear window 68 in this latter embodiment (FIGS. 7A, 7B), rear window 68 may be spring-loaded and locked in a downward position by known locking mechanisms when retracted inside rear wall 40. Thus retracting rear window 68 into rear wall 40 generates tension in a spring (not shown) attached to rear window 68. Upon returning rear wall 40 to its vertical position during unfolding of seat 30, rear window 68 is released and sprung upward most of the distance to its full upright position, whereupon a user manually slides rear window 68 the remaining distance upward until rear window 68 is in its maximum vertical position and is held in place by appropriate latch mechanisms. In other embodiments the movement of rear window 68 may be motor-driven and completely automated.

Preferably, roof panel 70 slides forward to allow taller cargo 72 to be loaded (FIGS. 5A, 5B, 5C). Roof panel 70 can be a glass sunroof, as shown in the figures, or can be a solid panel of any suitable material, including, e.g. metal or fiberglass.

Figure 6A:
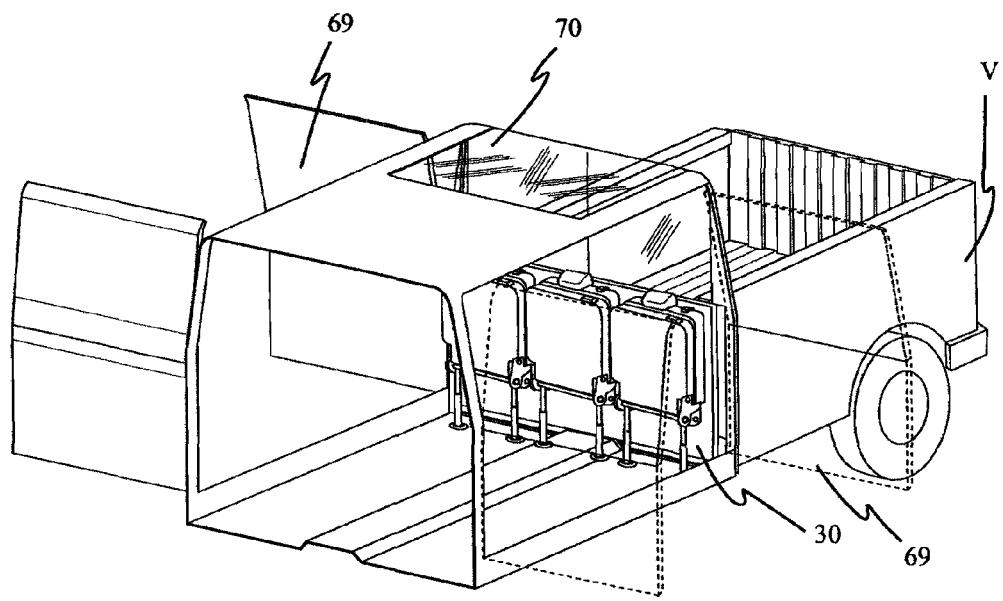
FIG. 6A is a schematic partial perspective view of a vehicle having a rear passenger compartment with the fold-down seat of the present invention folded into an upward position to permit cargo carriage between the back of the front seats and the folded upright rear seats.
Figure 6B:
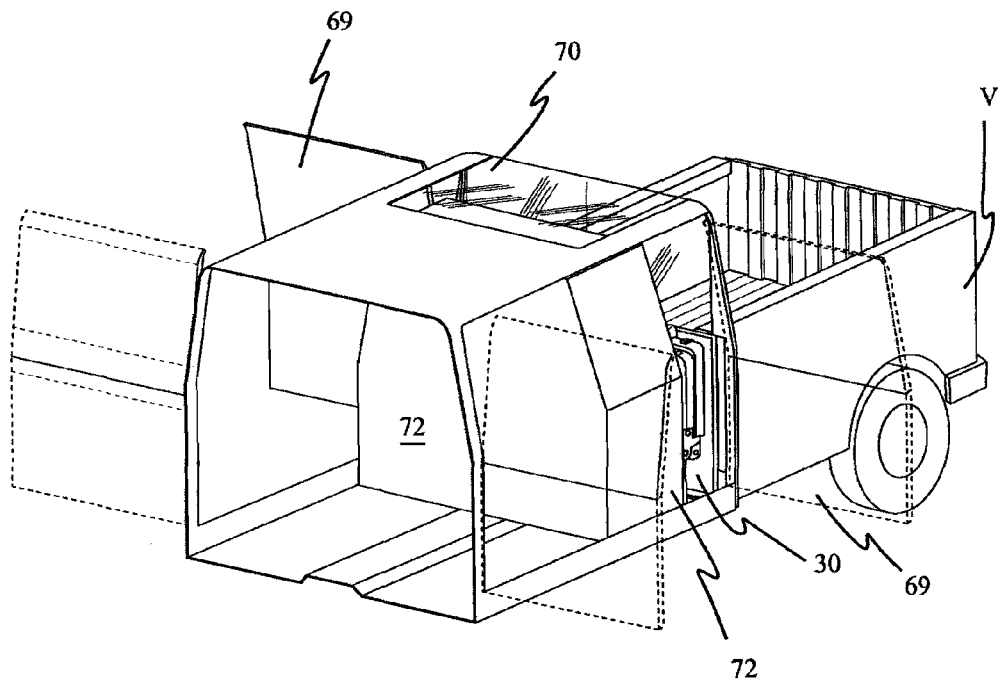
FIG. 6B is a schematic partial perspective view of the vehicle of FIG. 6A showing a large item of cargo loaded into a rear passenger compartment where the fold-down seat has been folded into an upward position.

In yet another embodiment cargo 72 can be loaded in the passenger seating area through the side doors of the vehicle when seat 30 is folded upwardly and out of the way (FIG. 6A, 6B). For wide cargo that is not higher than the door opening it is preferable that there is a large opening space from the vehicle's side doors, which can be achieved, for example, by having the rear doors hinged near the rear of the vehicle cab, as shown, for example, in FIGS. 6A, 6B.

The fold down seat 30, the folding rear wall 40, the openable rear windows, and the sliding roof portion 70 together comprise a cargo accommodation system for a vehicle in which cargo 72 can be loaded in front of the folded up seat (FIG. 6B) or on top of the folded down seat (FIG. 5C). In the latter case folding down rear wall 40 extends cargo bed 54 and moving rear windows 68 and roof panel 70 increases the vertical space available for taller cargo 72.

To prevent cargo 72 from sliding forward and striking the vehicle's front seats, particularly in the case of a sudden stop, there is preferably provided a flip stop section 78, illustrated in FIG. 9B, for example, hingedly connected to the uppermost end of rear wall 40. Flip stop 78 locks into an approximately vertical orientation when seat 30 and rear wall 40 are folded down into an approximately horizontal position, and can be manually or automatically deployed into its vertical position as rear wall 40 is folded down. Automatic deployment of the protective flip stop 78 can be powered by an actuator motor coupled to flip stop section 78 or can be driven by the folding down of rear wall 40, using an actuator attached to third hinge point 52 and coupled via a cable and conduit connection. Alternatively, flip stop 78 is manually deployed by the user after folding down of rear wall 40. As a further alternative structure, flip stop 78 can be biased with a spring (not shown) towards the vertical, deployed position while a cable pulls against this spring force to fold flip stop 78 down when rear wall 40 is returned to its vertical position.

After flip stop 78 is deployed into its approximately vertical position behind the front seats (or possibly second row seats in the case of a three seating row vehicle) of the vehicle, it can be secured in place by a variety of mechanisms. For convenience, conventional hook and loop fastener material may be used to hold up flip stop 78, with one side of the faster being attached to the rear of the seat and the other side of the fastener being attached to flip stop 78. Alternatively hooks such as J-hooks can be used to attach flip stop 78 to the "B" pillar on the side of the vehicle. Other suitable retention mechanisms will be apparent to one skilled in the art.

The ultra-thin seat base 32 and seat back 34 can be made more comfortable for the seat occupant through the use of self-presenting ergonomic devices mounted in the seats, including lumbar supports, thigh bolsters, and back bolsters. These devices, which are described in U.S. Pat. No. 6,905,170, United States Published Application No. US 2004/0155501, and United States Published Application No. US 2004/0140705, incorporated herein by reference, automatically fold into flat profiles when the seat base 32 or back 34 is folded up or down, respectively, using an actuator mechanism driven by the folding motion itself. In a preferred embodiment the actuator is driven by motion at first hinge point 42. Using self-presenting comfort support technology, seats such as those described herein can have very thin folded profiles, thereby increasing the available cargo space, while still offering comfort to the seat occupant when the seats are unfolded to the position shown in FIG. 1.

Figure 12B:
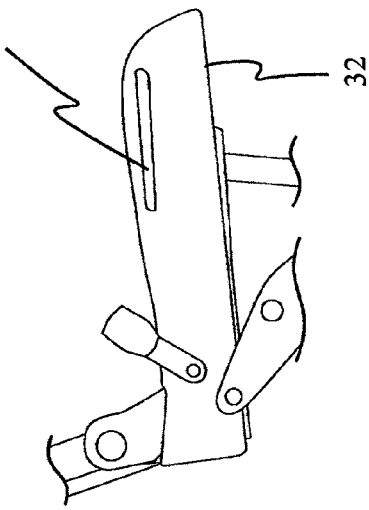
FIG. 12B is a partial elevational view of the seat of FIG. 1 illustrating the seat base with the cushion presenter in full in position.
Figure 11B:
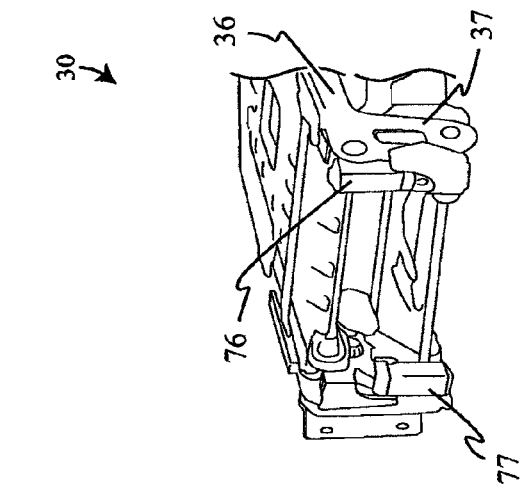
FIG. 11B is a partial right rear perspective view of the seat of FIG. 11A illustrating the actuator and bracket positions.
Figure 11A:
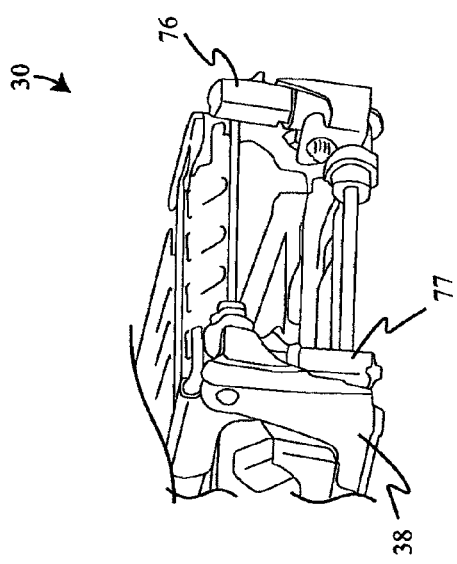
FIG. 11A is a partial left rear perspective view illustrating the actuator and bracket positions for the new seat in the fold-flat position.
Figure 12A:
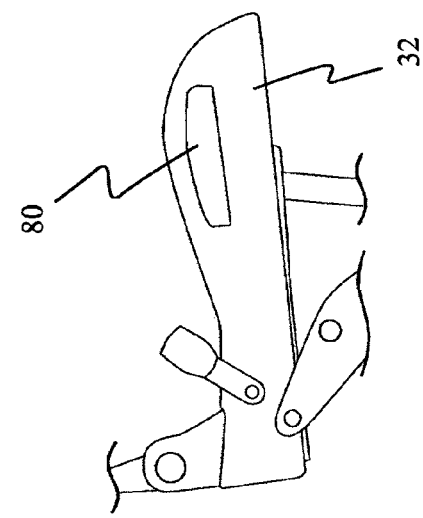
FIG. 12A is a partial side elevational view of the seat of FIG. 1 illustrating the seat base with a cushion presenter in full out position.
Figure 13E:
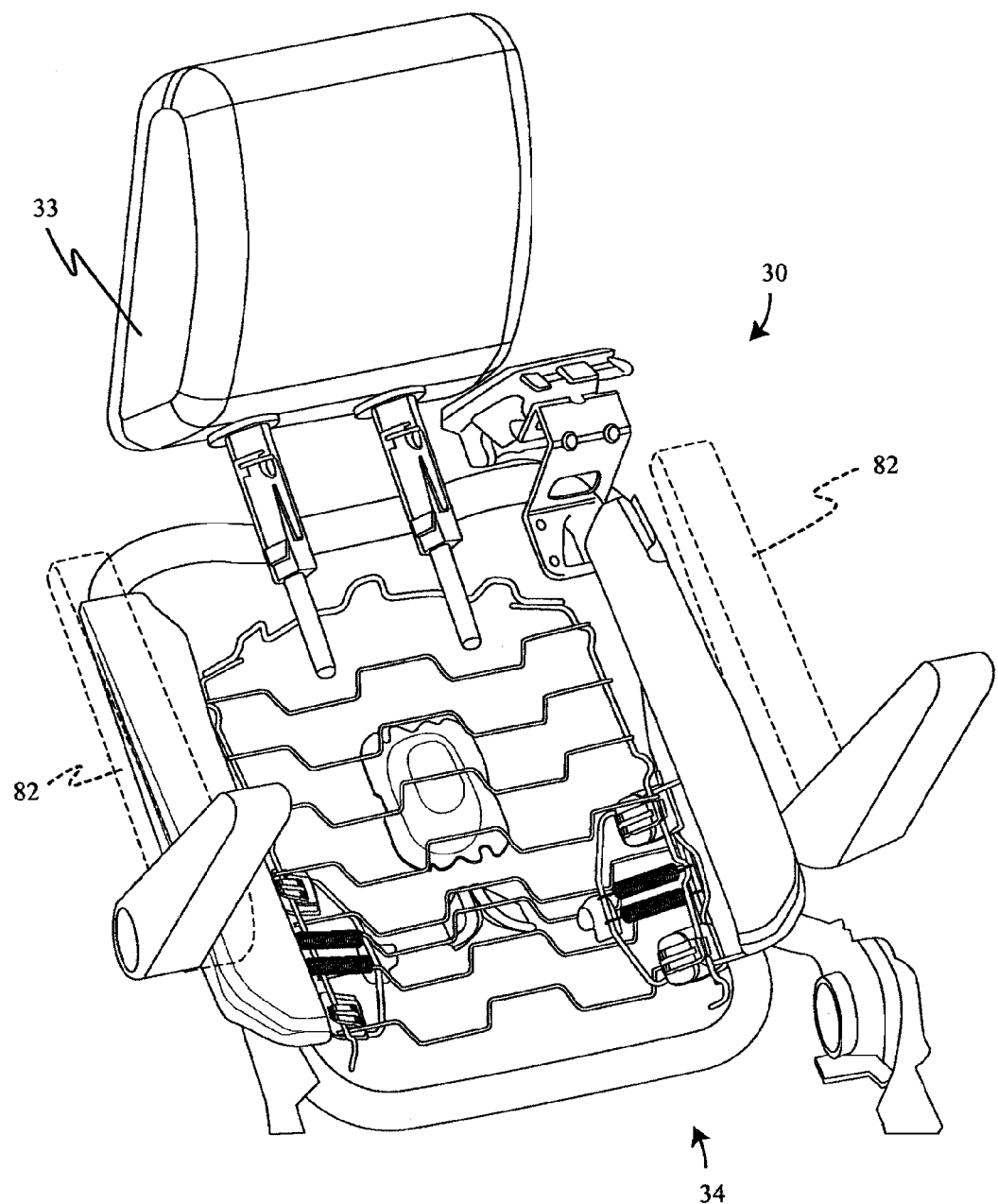
FIG. 13E is a partial perspective view of a seat of the present invention shown without covering and illustrating the arm rests in a retracted position adjacent the seat back.
Figure 14B:
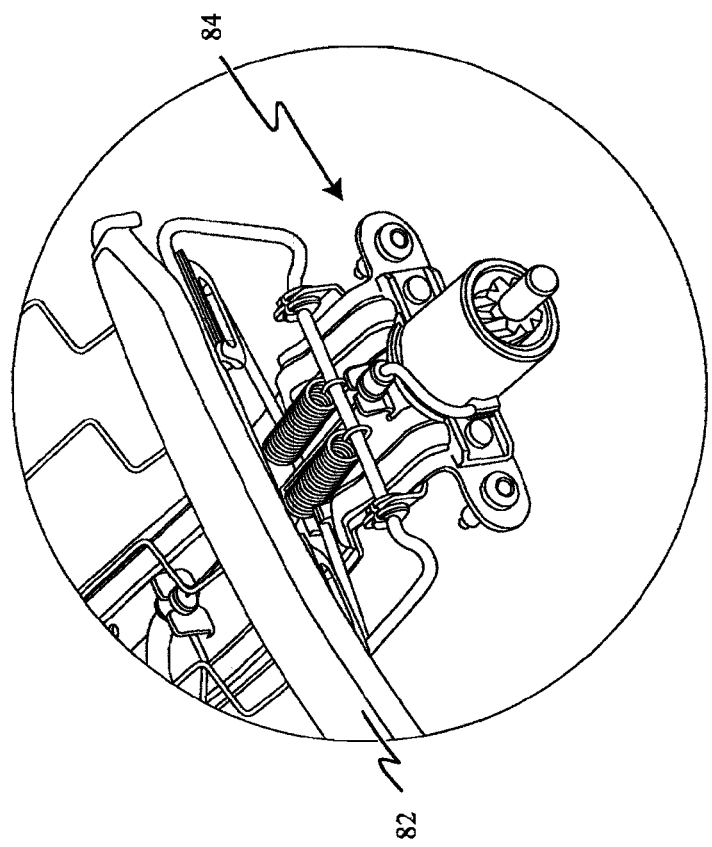
FIG. 14B is a partial enlarged perspective view of the actuator mechanism of the seat of FIG. 14A.
Figure 14A:
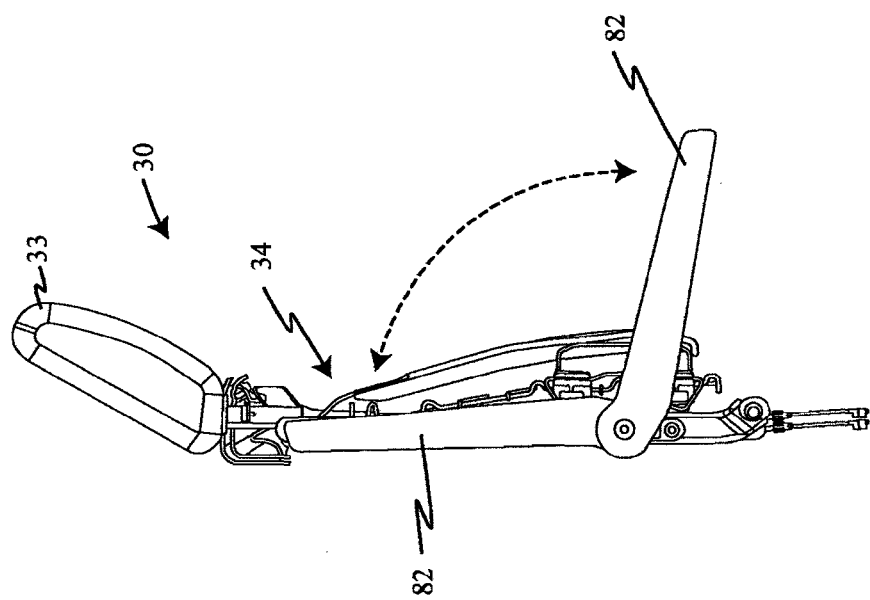
FIG. 14A is a partial schematic side elevational view of a seat of the present invention, showing an optional arm rest with a helical actuator mechanism.

Because second or third row seats often have shorter seat bases, the occupant of such a seat can feel discomfort, particularly on long trips, if there is not adequate thigh support on the front edge of the seat. However, excessive padding on the front edge of the seat will prevent the seat from folding into a compact package. Therefore, as illustrated in FIGS. 12A and 12B, there is preferably provided a self-driven cushion presenter 80 in or on the upper front portion of seat base 32 to add comfort and support for the seat occupant's thigh region. FIG. 12A shows the cushion presenter "full out" for use by a seat occupant when the seat frame is in the deployed position. FIG. 12B shows the cushion presenter 80 in a collapsed or "full in" position as would be normal when the seat frame is in a stowed position. The full in position of the presenter is achieved while the seat is still folding into a compact position to permit seat 30 to fold into a flat profile. Cushion presenter 80 in one embodiment is a pivoting paddle-type mechanism that rotates upward when seat 30 is unfolded, or deployed.

The rotational movement of cushion presenter 80 is driven by the pulling of a cable that is slidably disposed within a conduit, a Bowden cable assembly, where the cable itself is pulled on by an actuator associated with first pivot point 42.

In another optional addition for occupant comfort seat 30 may incorporate self-returning arm rests 82. Useful constructions of such armrests are shown in FIGS. 13A through 13E (showing a cable and spring retraction mechanism), and 14A through 14J (showing a helical gear drive mechanism). While the user moves the arm rests from the approximately vertical stored position into the approximately horizontal deployed position manually, the arm rests return to the stored position automatically when the seat is folded up. The self-returning feature is driven by the folding motion of the seat, wherein the necessary force is transferred from an actuator attached to the hinge mechanism to the arm rest by a conduit and cable system. Such self returning arm rests are described in U.S. provisional patent application 60/682,168, filed May 18, 2005, incorporated herein by reference.

Figure 18A:
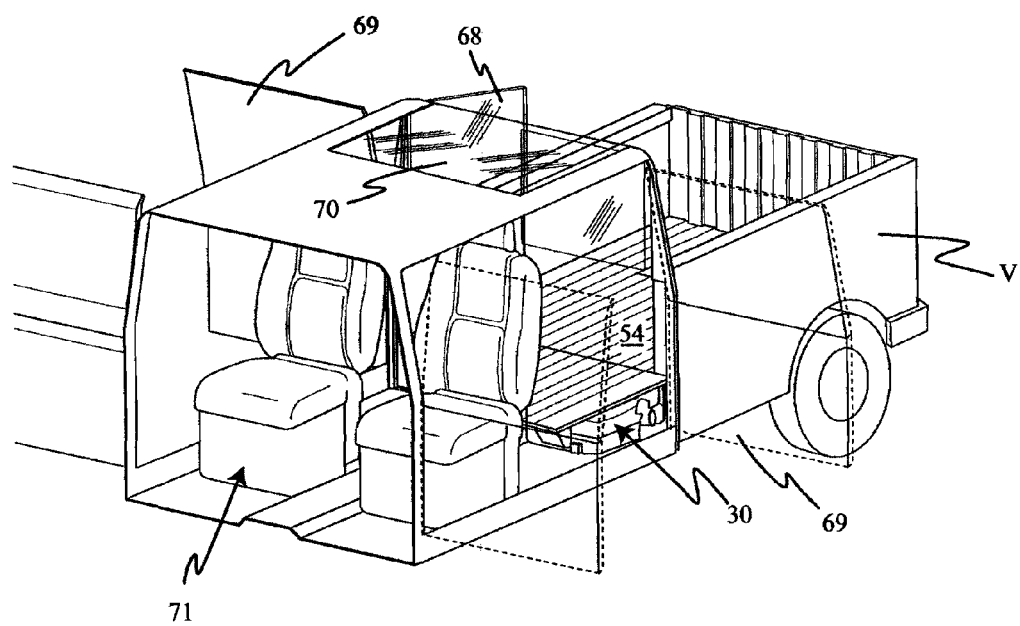
FIG. 18A is a partial perspective view of a vehicle with the new seat system in collapsed storage position, with the vehicle doors open and the roof panel partially moved to a forward position to accommodate excessively tall cargo.
Figure 18B:
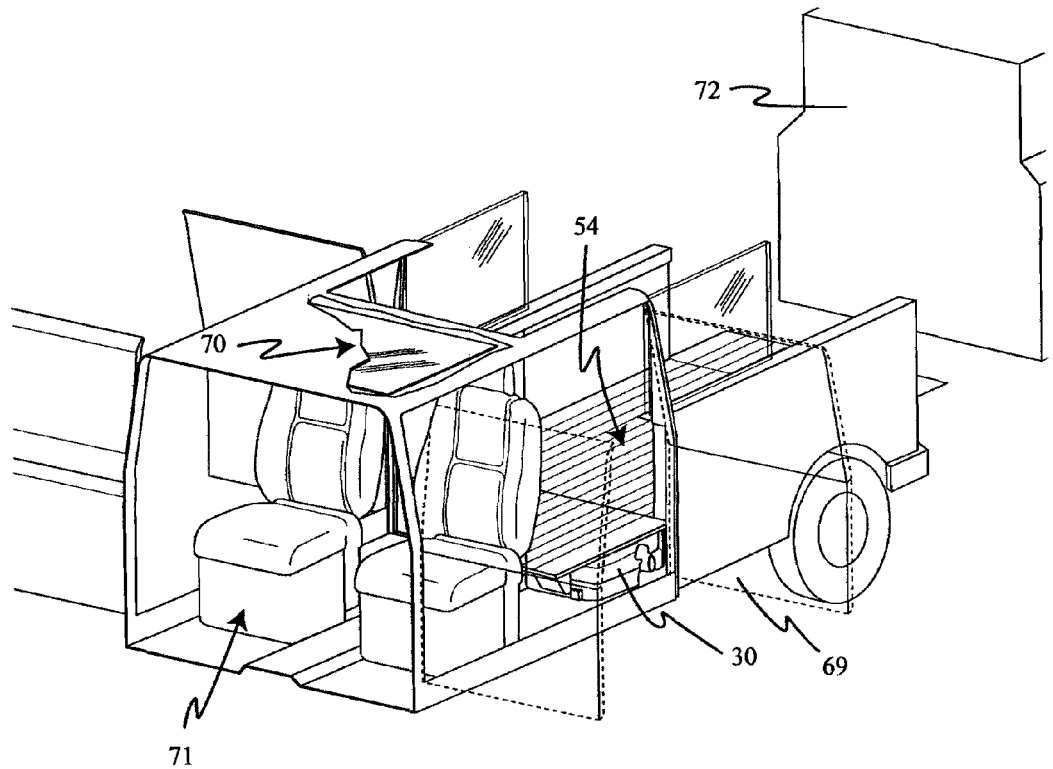
FIG. 18B is a perspective view of the vehicle of FIG. 18A showing cargo in position for transport and with the roof panel open, forward and windows open to the vehicle sides to permit receipt of the cargo into the vehicle bed.

FIGS. 18A through 18H and 19A, 19B illustrate use of the new fold-down stadium-style seat 30. FIG. 18A shows the new seats in the fold flat position with vehicle wall also folded down flat, level with the truck bed and the rear vehicle window open. The tailgate is down to receive cargo. FIG. 18B illustrates the oversized cargo, which is extra long and tall loaded into the vehicle bed with the rear row of passenger seats 30 folded down out of the way. The vehicle roof panel is pushed forwardly over the cab of the vehicle.

Figure 18C:
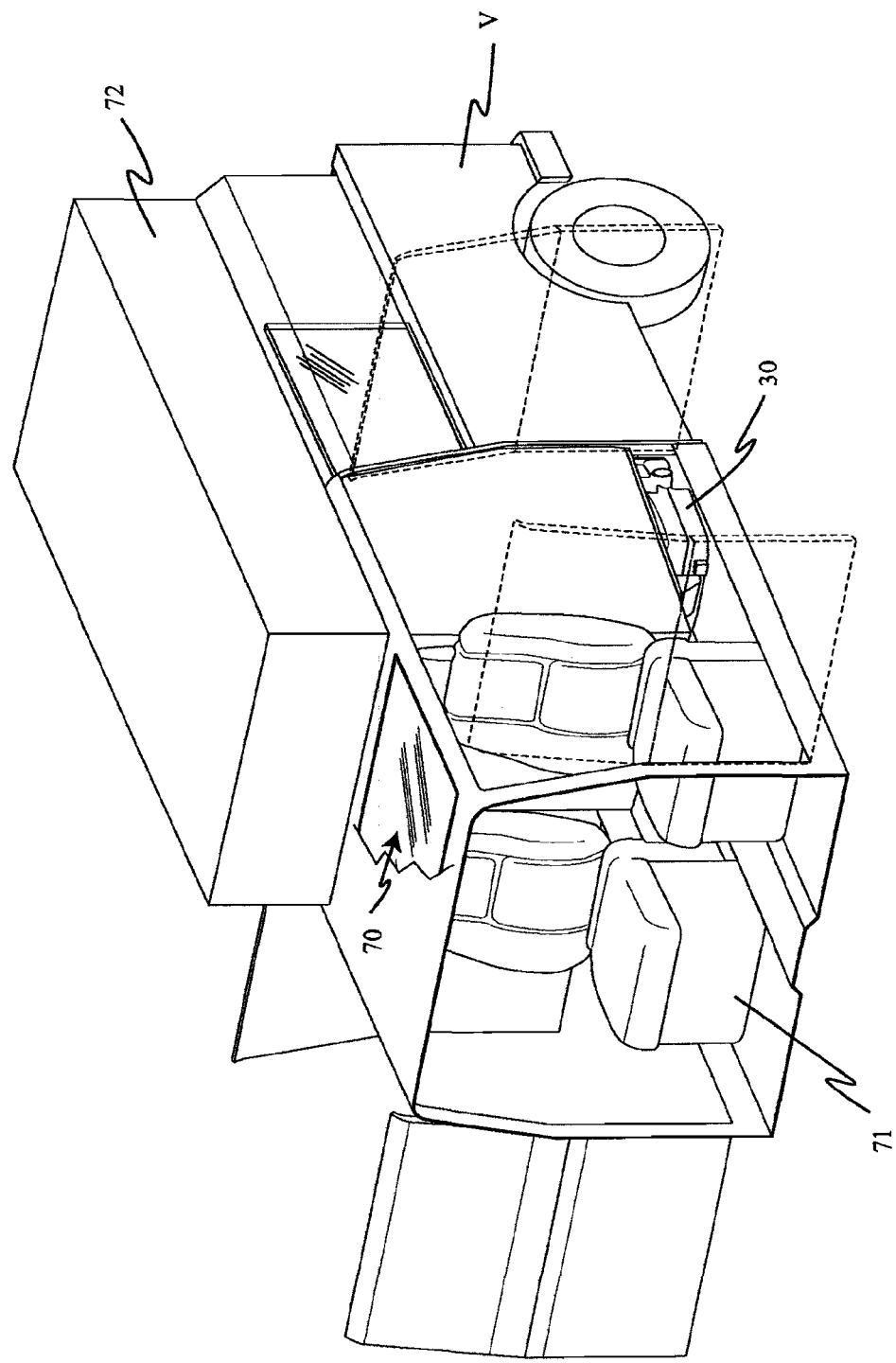
FIG. 18C is a perspective view of the vehicle of FIG. 18A showing the vehicle bed empty, seats down for storage, doors open and rear vehicle windows being closed, and the vehicle tailgate up.

FIG. 18C shows the same vehicle with the seats down as in FIG. 18A, but the roof panel is still partly closed and the tailgate is up. In FIG. 18D the roof panel is completely open and the truck is ready to receive the oversized cargo.

Figure 18E:
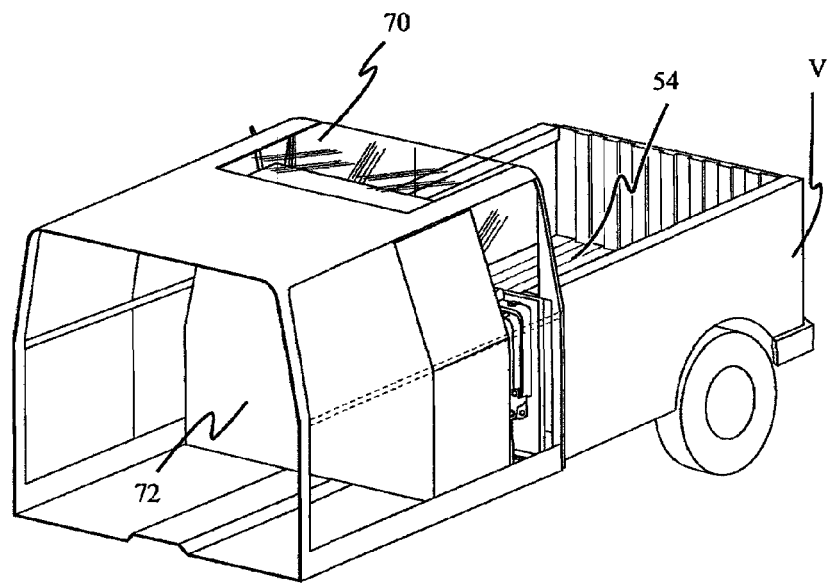
FIG. 18E is a perspective view of the vehicle of FIG. 18D with cargo in place in the cab of the vehicle, with vehicle doors closed.
Figure 18D:
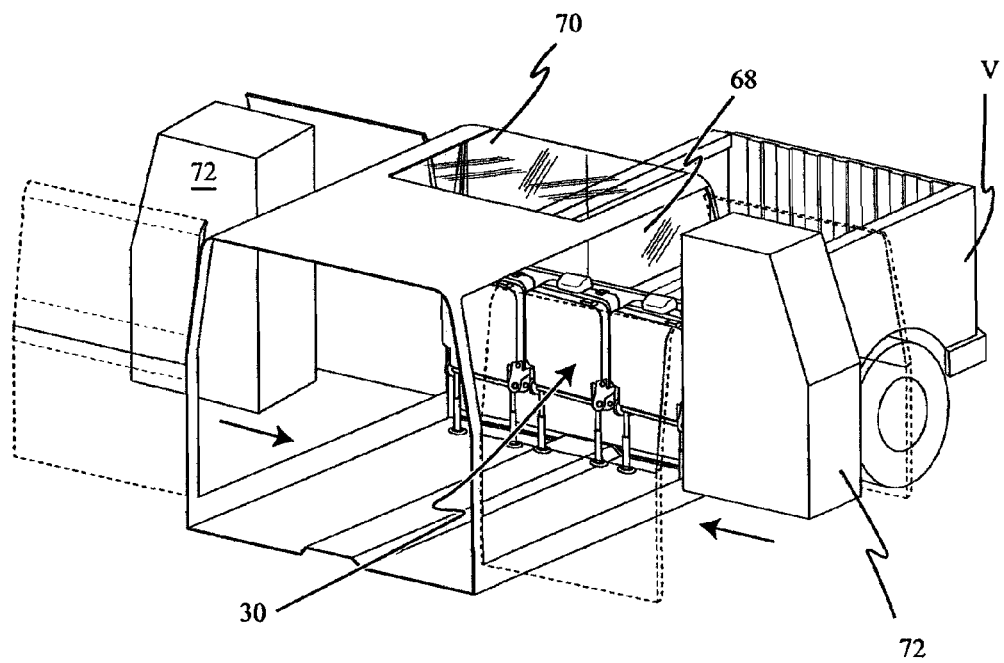
FIG. 18D is a perspective view of the vehicle of FIG. 18A with the rear vehicle window closed and seats up, stadium-style ("thin-fold") to permit entry of cargo in front of the rear seats, and behind the vehicle front seats, the front seats not being shown, for clarity of the drawings.
Figure 18F:
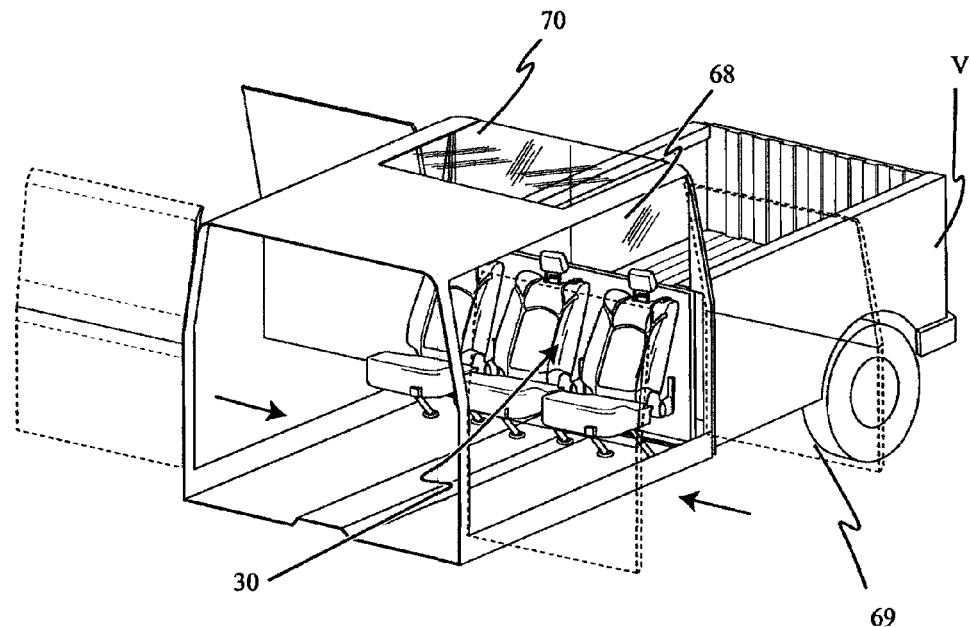
FIG. 18F is a perspective view of the vehicle of FIG 1. 18E after the cargo has been removed, the rear seats being up in closed sitting position and the roof panel and rear vehicle window being closed.

In FIG. 18E the truck tailgate is up. The front seats are not shown, for clarity and the rear row of seats 30 are up in folded flat, stadium position for providing the largest possible cargo space between the front and rear seats. The cargo is in place in FIG. 18E and is shown in FIG. 18F as if being loaded into or out of the position of FIG. 18E.

Figure 18G:
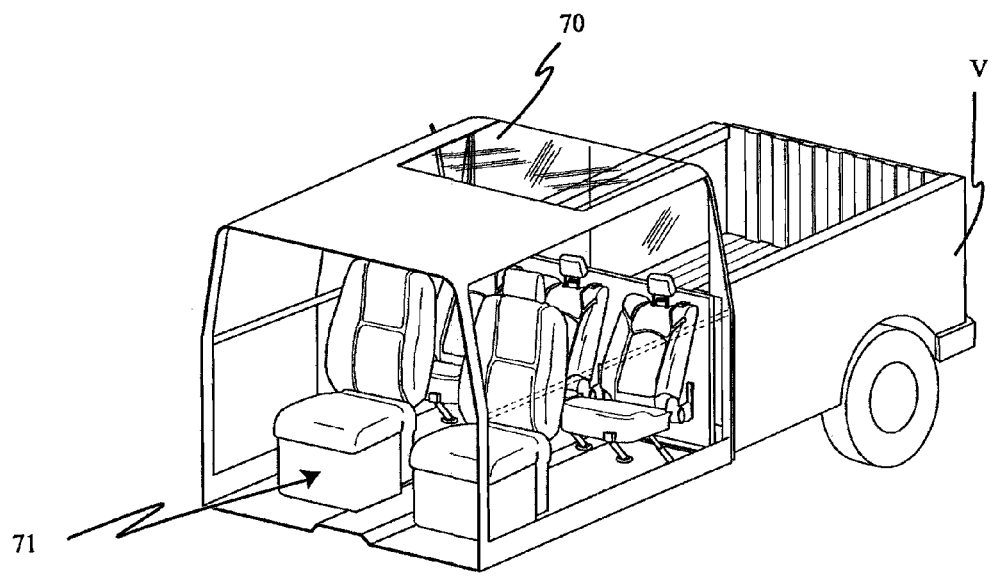
FIG. 18G is a perspective view of the vehicle of FIG. 18F with the vehicle doors closed and front seats shown, cargo in place within the cab of the vehicle.

FIGS. 18G and 18H illustrate the vehicle of the previous FIG. 18 series figures, with the rear row of seats 30 unfolded for seating and the truck side doors open and then closed in FIG. 18H.

Figure 19A:
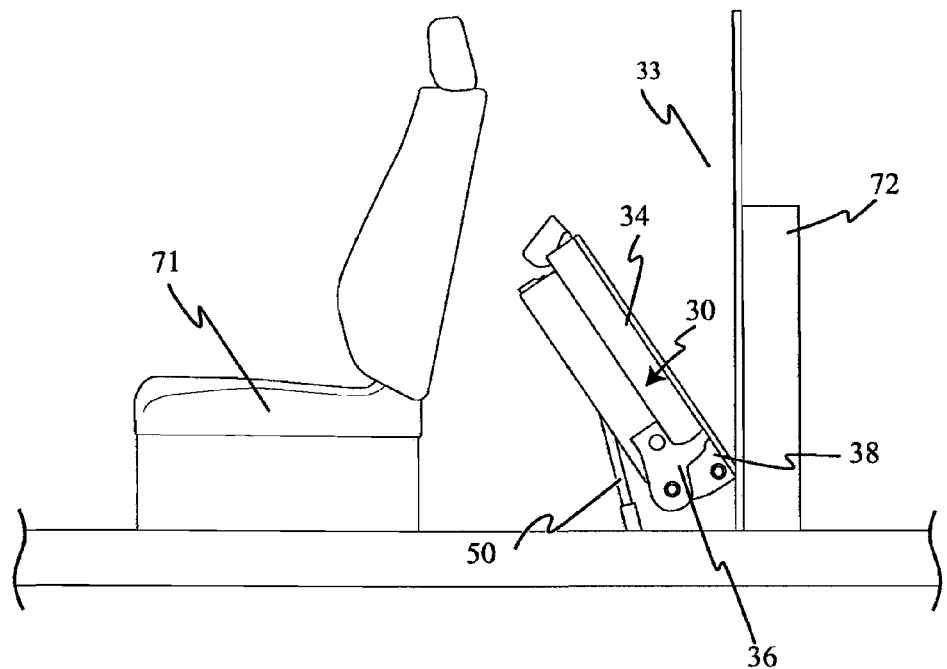
FIG. 19A is a partial side elevational view of a vehicle seat of FIG. 15A, in transition from upright stadium position to completely flat, stowed position.
Figure 19B:
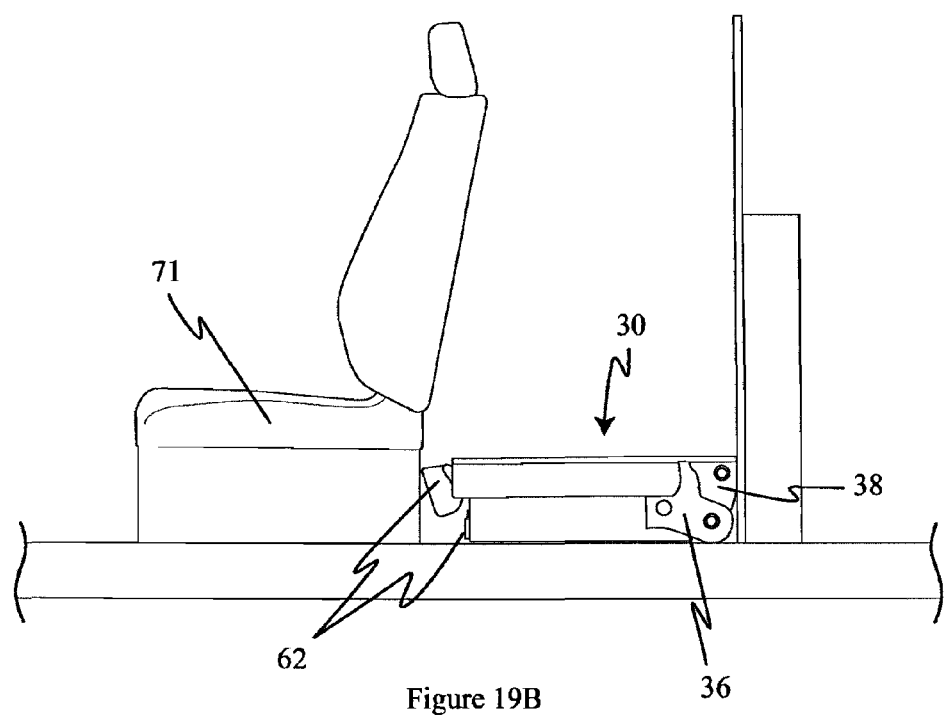
FIG. 19B is a partial side elevational view of the seat of FIG. 19A, in completely flat, stowed position.

FIGS. 19A is a further illustration of seat 30 with the piston style "leg" in the partially folded down position, and in FIG. 19B in the folded flat position for fitting cargo behind the front vehicle seat.

Although embodiments described herein are discussed in terms of a seat facing forward in a vehicle, it is understood that the basic principles underlying the folding seat are applicable to any folding seat regardless of the orientation and regardless of whether the seat is employed in a vehicle or in other settings.

As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A folding seat for a vehicle comprising:
    a seat base fixedly attached to an intermediate bracket;
    a seat back having a lower end; and
    a support bracket fixedly attached to a rear vehicle wall;
    said intermediate bracket having a first hinge point at which said seat back lower end is hingedly attached to the intermediate bracket; and
    wherein said intermediate bracket has a second hinge point at which the intermediate bracket is hingedly attached to said support bracket, said second hinge point being spatially removed from said first hinge point, such that upon folding of said seat base into a vertical position, said intermediate bracket rotates on said second hinge point, said second hinge point remaining stationary and said first hinge point rotating upwardly and rearwardly around the second hinge point, so as to move said first hinge point and said lower portion of said seat back rearwardly as said seat back and said seat base are folded into a substantially vertical orientation in close proximity to the rear vehicle wall.

2. The folding seat of claim 1 wherein said seat back is reclined, when the seat is in an unfolded, seating position, at an angle of between approximately 20 degrees and approximately 30 degrees relative to vertical.

3. The folding seat of claim 2 wherein said seat back is reclined at an angle of approximately 25 degrees relative to vertical.

4. The folding seat of claim 1 wherein said first hinge point is above the plane of said seat base when said seat base is unfolded.

5. The folding seat of claim 1 wherein said second hinge point is below the plane of said seat base when said seat base is unfolded.

6. The folding seat of claim 2 wherein said support bracket is hingedly attached to said vehicle at a third hinge point.

7. The folding seat of claim 6 wherein said vehicle has an approximately planar cargo bed, wherein said third hinge point is disposed below the plane of said cargo bed.

8. The folding seat of claim 7 wherein said rear wall is capable of folding forward and downward into a substantially horizontal orientation with said seat disposed thereunder in a folded position.

9. The folding seat of claim 8 wherein said rear wall is substantially co-planar with said cargo bed when said rear wall is folded downward.

10. The folding seat of claim 1 wherein a top portion of said seat back is slidably attached to said rear wall.

11. The folding seat of claim 1 further comprising a piston pivotably attached to said seat base and pivotably attached to said vehicle, said piston providing support for said seat base when in an unfolded position.

12. The folding seat of claim 1 wherein said seat back has an adjustable headrest disposed thereon.

13. The folding seat of claim 1 wherein at least one of said seat base and said seat back has an ergonomic device disposed therein.

14. The folding seat of claim 13 wherein said ergonomic device has a greater depth of space when said seat is unfolded and a lesser depth of space when said seat is folded.

15. The folding seat of claim 6 wherein said seat back folds down independently of said rear wall.

16. The folding seat of claim 1 wherein said seat comprises at least two of said seat back and at least two of said seat base, each adjacent one another and separately foldable.

17. The folding seat of claim 6 wherein at least one of said seat back and said seat base further comprises a lever attached thereto, wherein said lever actuates a latch mechanism to lock said seat back or said seat base in a folded or unfolded position.

18. The folding seat of claim 1, and further comprising a seat bracket connected to the lower end of said seat back, wherein said seat bracket is pivotally connected to the first hinge point of said intermediate bracket, thereby permitting said seat back to pivot relative to said intermediate bracket as said intermediate bracket is rotated relative to said support bracket on said second pivot point.

19. A method of folding up a seat for a vehicle, the method comprising:
   providing a seat base fixedly attached to an intermediate bracket by a seat bracket;
   providing a seat back hingedly attached to said intermediate bracket at a lower end of said seat back, wherein said seat back is hingedly attached at a first hinge point, said first hinge point being disposed above the plane of said seat base when said seat is unfolded;
   providing a support bracket, said support bracket being fixedly attached to a rear wall of said vehicle;
   hingedly attaching said intermediate bracket to said support bracket at a second hinge point, wherein said second hinge point is below the plane of said seat base when said seat is unfolded; and
   folding said seat base upward, wherein said intermediate bracket rotates upward and said first hinge point moves towards said rear wall of said vehicle.

20. A folding seat for a vehicle comprising:
   a seat base fixedly attached to an intermediate bracket;
   a seat back; and
   a support bracket fixedly attached to a rear wall of said vehicle, said rear wall being disposed behind said seat;
   wherein a lower end of said seat back is hingedly attached to said intermediate bracket at a first hinge point on said intermediate bracket;
   wherein said intermediate bracket is hingedly attached to said support bracket at a second hinge point on said intermediate bracket, said second hinge point being spatially removed from said first hinge point;
   wherein said vehicle has an approximately planar cargo bed;
   wherein said support bracket is hingedly attached to said vehicle at a third hinge point, said third hinge point being disposed below the plane of said cargo bed;
   such that upon folding of said seat base into a vertical position, said intermediate bracket rotates upwards, said first hinge point being moved rearwards so as to move said first hinge point and said lower portion of said seat back rearwards so that said seat back and said seat base are folded into a substantially vertical orientation;
   such that upon folding said rear wall forward and downward into a substantially horizontal orientation with said seat disposed thereunder in a folded position, said rear wall is substantially co-planar with said cargo bed.

21. A cargo accommodation system for a vehicle, comprising:
   a vehicle folding seat, a moving roof panel, and an openable rear window;
   wherein said folding seat comprises:
      a seat base fixedly attached to an intermediate bracket;
      a seat back; and
      a support bracket fixedly attached to a rear wall of said vehicle, said rear wall being disposed behind said seat;
      wherein a lower end of said seat back is hingedly attached to said intermediate bracket at a first hinge point on said intermediate bracket;
      wherein said intermediate bracket is hingedly attached to said support bracket at a second hinge point on said intermediate bracket, said second hinge point being spatially removed from said first hinge point;
      wherein said vehicle has an approximately planar cargo bed;
      wherein said support bracket is hingedly attached to said vehicle at a third hinge point, said third hinge point being disposed below the plane of said cargo bed;
      such that upon folding of said seat base into a vertical position, said intermediate bracket rotates upwards, said first hinge point being moved rearwards so as to move said first hinge point and said lower portion of said seat back rearwards so that said seat back and said seat base are folded into a substantially vertical orientation;
      such that upon folding said rear wall forward and downward into a substantially horizontal orientation with said seat disposed thereunder in a folded position, said rear wall is substantially co-planar with said cargo bed;
   wherein said moving roof panel slides forward and rearward, away from and towards said cargo bed; and
   wherein said openable rear window comprises:
   a pair of panels adjacent one another, each panel being hingedly attached to said vehicle at a lateral edge of said panel.

* * * * *